(12) United States Patent
Kim et al.

(10) Patent No.: US 7,430,193 B2
(45) Date of Patent: Sep. 30, 2008

(54) METHOD AND APPARATUS FOR EMBODYING AND SYNCHRONIZING DOWNLINK SIGNAL IN MOBILE COMMUNICATION SYSTEM AND METHOD FOR SEARCHING CELL USING THE SAME

(75) Inventors: Kwang-Soon Kim, Daejeon (KR); Kyung-Hi Chang, Daejeon (KR); Yong-Soo Cho, Seoul (KR); Tae-Gon Kim, Seoul (KR)

(73) Assignees: Electronics and Telecommunications Research Institute, Daejeon (KR); Chung-Ang University, Seoul (KR)

( * ) Notice: Subject to any disclaimer, the term of this patent is extended or adjusted under 35 U.S.C. 154(b) by 233 days.

(21) Appl. No.: 10/536,593

(22) PCT Filed: Nov. 29, 2002

(86) PCT No.: PCT/KR02/02241

§ 371 (c)(1),
(2), (4) Date: Sep. 28, 2005

(87) PCT Pub. No.: WO2004/049618

PCT Pub. Date: Jun. 10, 2004

(65) Prior Publication Data

US 2006/0114812 A1    Jun. 1, 2006

(30) Foreign Application Priority Data

Nov. 26, 2002    (KR) .................. 10-2002-0073789

(51) Int. Cl.
| | |
|---|---|
| *H04B 7/00* | (2006.01) |
| *H04B 7/216* | (2006.01) |
| *H04B 7/212* | (2006.01) |
| *H04Q 7/00* | (2006.01) |
| *H04Q 7/24* | (2006.01) |
| *H04J 3/00* | (2006.01) |
| *H04J 1/00* | (2006.01) |
| *H04J 3/06* | (2006.01) |

(52) U.S. Cl. ..................................... 370/338
(58) Field of Classification Search ......... 370/335–337, 370/342, 345, 347, 350, 498, 500, 506, 509, 370/330, 343, 310, 338
See application file for complete search history.

(56) References Cited

U.S. PATENT DOCUMENTS 4,796,279 A * 1/1989 Betts et al. .................. 375/229

(Continued)

FOREIGN PATENT DOCUMENTS

EP    1411651 A *    4/2004

(Continued)

OTHER PUBLICATIONS

'TDMA Frame Synchronization of Mobile Stations Using a Radio Clock Signal for Short Range Communications' Zhu, Communication Networks, Aachen University of Technology, Aachen, Germany, 1994 IEEE, pp. 1878-1882.

(Continued)

*Primary Examiner*—Lester Kincaid
*Assistant Examiner*—Nathan Mitchell
(74) *Attorney, Agent, or Firm*—Ladas & Parry LLP

(57) ABSTRACT

In an OFDMA-based cellular system, a frame of a downlink signal includes a common slot and traffic slots. The common slot includes a synchronization preamble and a cell search preamble. The synchronization preamble has a structure for synchronizing time and frequency, and the cell search preamble has a cell search structure. The traffic slot includes pilot symbols provided on the time and frequency axes. A cyclic prefix is used to estimate initial symbol synchronization, and the initial symbol synchronization and the synchronization preamble are used to synchronize the frame. The synchronization frame and the cell search preamble are used to estimate time and frequency synchronization. The cell search preamble is used to search cells. When the initial synchronization is performed, the cyclic prefix is used to track the frequency, the synchronization preamble is used to track symbol synchronization, and the cell search preamble is used to track fine frequency synchronization.

14 Claims, 20 Drawing Sheets

U.S. PATENT DOCUMENTS

| | | | |
|---|---|---|---|
| 5,930,366 A * | 7/1999 | Jamal et al. | 370/509 |
| 5,995,483 A * | 11/1999 | Marchok et al. | 370/207 |
| 6,185,244 B1 * | 2/2001 | Nystrom et al. | 375/145 |
| 6,434,205 B1 | 8/2002 | Taura et al. | |
| 6,567,482 B1 * | 5/2003 | Popovic' | 375/343 |
| 6,934,553 B2 * | 8/2005 | Kuroiwa et al. | 455/500 |
| 6,961,565 B2 * | 11/2005 | Tanno et al. | 455/434 |
| 6,965,633 B2 * | 11/2005 | Sun et al. | 375/145 |
| 7,061,966 B2 * | 6/2006 | Storm et al. | 375/145 |
| 7,099,667 B2 * | 8/2006 | Saito et al. | 455/437 |
| 2003/0169702 A1 * | 9/2003 | Ryu et al. | 370/320 |

FOREIGN PATENT DOCUMENTS

| | | |
|---|---|---|
| JP | 2002524990 | 8/2002 |
| KR | 100294711 | 10/2000 |
| KR | 100311529 | 6/2001 |
| WO | 00/14989 | 3/2000 |
| WO | 00/59147 | 10/2000 |
| WO | WO 02078280 A2 * | 10/2002 |

OTHER PUBLICATIONS

'Optimum Frame Synchronization of Preamble-less Packets Surrounded by Noise with Coherent and Differentially Coherent Demodulation' Robertson, German Aerospace Research Establishment (DLR), Institute for Communications Technology, Oberpfaffenhofen, Germany, pp. 874-879.

'Adaptative Digital Access Protocol: A MAC Protocol for Multiservice Broadband Access Networks' Dail et al., IEEE Communications Magazine, Mar. 1996, pp. 104-112.

Almenar, V, et al. "Synchronization techniques for HIPERLAN/2", Vehicular Technology Conference, 2001. VTC 2001 Fall. IEEE VTS 54$^{th}$ 2001 vol. 2 pp. 762-765.

Stefan A. Fechtel, et al, "OFDM Carrier and Sampling Frequency Synchronization and Itsperformance on Stationary and Mobile Channels" Consumer Electronics, IEEE Transactions on vol. 46, Issue 3, Aug. 2000 pp. 438-441.

* cited by examiner

METHOD AND APPARATUS FOR EMBODYING AND SYNCHRONIZING DOWNLINK SIGNAL IN MOBILE COMMUNICATION SYSTEM AND METHOD FOR SEARCHING CELL USING THE SAME

CROSS REFERENCE TO RELATED APPLICATION

This application claims priority to and the benefit of Korea Patent Application No. 2002-73789 filed on Nov. 26, 2002 in the Korean Intellectual Property Office, the entire content of which is incorporated herein by reference.

BACKGROUND OF THE INVENTION (a) Field of the Invention

The present invention relates to a method and apparatus for embodying and synchronizing downlink signals in a mobile communication system, and a method for searching cells using the same. More specifically, the present invention relates to a method for generating a structure of a preamble and a pilot appropriate for downlinks of an OFDMA (orthogonal frequency division multiplexing access)-based cellular system, performing synchronization, and searching cells at a terminal by using the structure.

(b) Description of the Related Art

In general, a terminal is required to read signals of a base station and synchronize its time and frequency with the terminal for initial synchronization, and search cells in a cellular system. When initially synchronized, the terminal is also needed to track the time and frequency, synchronize time and frequency of adjacent cells, and search the cells thereof for handover.

Downlinks for enabling initial synchronization, cell search, tracking, and adjacent cell search are provided to the GSM which is a conventional TDMA (time division multiplexing access)-based cellular system, or the IS-95, cdma2000, and W-CDMA which are CDMA (code division multiplexing access)-based cellular systems.

For example, in the W-CDMA system, a P-SCH (primary synchronization channel) and an S-SCH (secondary synchronization channel) of 256-chip lengths are provided for each slot start point so that slot synchronization may be estimated by using the P-SCH, and a scrambling code group number and frame synchronization may be estimated by using the S-SCH. In this instance, a time for estimating the synchronization is minimized by using the P-SCHs of the same pattern for respective slots of each cell, and frame synchronization and a scrambling code group are estimated by using a different pattern per 64 different scrambling code groups and using a different pattern per slot. A P-CPICH (primary common pilot channel) is used to find one of eight major scrambling codes within a scrambling code group, the scrambling code is used to demodulate cell information provided on a P-CCPCH (primary common control channel) and obtain the cell information, and hence, the cell search is finished.

Conventional OFDMA-based systems include the DAB (digital audio broadcasting), the DVB (digital video broadcasting), the IEEE802.11a, and the Hiperlan/2. The DAB uses a null symbol and a phase reference symbol for frame synchronization, and the DVB uses a pilot for the frame synchronization. Also, the IEEE802.11a and the Hiperlan/2 use a preamble to synchronize downlink burst. However, it is difficult for the OFDMA-based cellular systems to perform synchronization and search the cells through the conventional structure since the OFDMA-based systems are not cellular systems.

SUMMARY OF THE INVENTION

It is an advantage of the present invention to provide a structure of a preamble and a pilot for synchronizing downlinks and searching cells with a lesser amount of calculation in the OFDMA-based cellular system.

In a first aspect of the present invention, in a device for configuring a downlink signal in a mobile communication system, a device for configuring a downlink signal comprises: a first preamble generator for generating a first preamble having a first symbol and a second symbol so that a phase difference between the first and second symbols may be 180° for the purpose of time and frequency synchronization; a second preamble generator for generating a second preamble including at least one transmit symbol so that the second preamble may have specific patterns for a plurality of cells for the purpose of cell search; and a pilot pattern generator for generating a pilot pattern to be allocated to a plurality of pilot symbols to be provided on the time axis and the frequency axis, wherein a frame of the downlink signal includes a first slot which has the first and second preambles, and a plurality of second slots having the pilot symbols.

In a second aspect of the present invention, a downlink signal synchronizer in a mobile communication system wherein a frame of the downlink signal comprises: a first slot which includes a first preamble for time and frequency synchronization and a second preamble which has a pattern specific to each cell for cell search; and a plurality of second slots which have a plurality of pilot symbols provided on the time axis and the frequency axis, comprises: an initial synchronization estimator which includes an initial symbol synchronization estimator for using a cyclic prefix of the downlink signal and estimating initial symbol synchronization; a frame synchronization estimator for using the symbol synchronization estimated by the initial symbol synchronization estimator and the first preamble and estimating frame synchronization; and a time and frequency synchronization estimator for using the estimated frame synchronization and the first and second preambles and estimating fine symbol synchronization and frequency synchronization; and a cell searcher for using a pattern specific to each cell of the second preamble and searching the cells when the symbol synchronization and the frequency synchronization are controlled by the initial synchronization estimator.

In a third aspect of the present invention, in a method for synchronizing downlink signals of a mobile communication system, and searching cells wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, a method for synchronizing downlink signals and searching cells comprises: (a) estimating a point at which correlation of a cyclic prefix of the downlink signal and a valid symbol becomes the maximum as a symbol timing, and estimating initial symbol synchronization; (b) using a characteristic that the real number part of the autocorrelation of the estimated initial symbol synchronization and the first and second symbols has a negative sign, and estimating frame synchronization; (c) using the estimated frame synchronization and the first and second preambles, and estimating time and frequency synchronization; and (d) using the second preamble and searching the cells when the time and frequency are synchronized through the synchronization step of (c).

In a fourth aspect of the present invention, in a method for synchronizing and searching adjacent cells from downlink signals of a mobile communication system wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, a method for synchronizing adjacent cells and searching cells comprises: (a) calculating autocorrelation of a cyclic prefix of the downlink signal and a valid symbol; (b) excluding a result which corresponds to a symbol start position of the current cell from a result of the autocorrelation, estimating a point for maximizing the autocorrelation, and estimating initial symbol synchronization of adjacent cells; (c) using the estimated initial symbol synchronization of the adjacent cell, and estimating autocorrelation of the first preamble; (d) excluding a result which corresponds to a frame start position of the current cell from a result of the autocorrelation estimated in (c), estimating a point for maximizing the result of the autocorrelation, and estimating frame synchronization of adjacent cells; (e) using the estimated frame synchronization of the adjacent cells and the first and second preambles, and estimating time and frequency synchronization of the adjacent cells; and (f) using the second preamble to search the cells, and excluding a result which corresponds to the current cell from the cell search result to search the cells.

In a fifth aspect of the present invention, in a method for synchronizing and searching adjacent cells from downlink signals of a mobile communication system wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, and a pilot pattern of the pilot symbol in the second slot includes a first pattern in common for each cell and a second pattern different for each cell, a method for synchronizing adjacent cells and searching cells comprises: (a) calculating autocorrelation of a cyclic prefix of the downlink signal and a valid symbol; (b) excluding a result which corresponds to a symbol start position of the current cell from a result of the autocorrelation, estimating a point for maximizing the autocorrelation, and estimating initial symbol synchronization of adjacent cells; (c) using the estimated symbol synchronization of the adjacent cell, and signal-processing the first pattern; (d) excluding a slot position of the current cell from the signal processed result in (c), selecting a point for maximizing the signal processed result, and estimating slot synchronization of adjacent cells; (e) using the estimated slot synchronization of the adjacent cells, and estimating autocorrelation of the first preamble; (f) excluding a result which corresponds to a frame start position of the current cell from a result of the autocorrelation estimated in (e), estimating a point for maximizing the result of the autocorrelation, and estimating frame synchronization of the adjacent cell; (g) using the estimated frame synchronization of the adjacent cell and the first and second preambles, and estimating time and frequency synchronization of the adjacent cell; and (h) using the second preamble to search the cells, excluding a result which corresponds to the current cell from the cell search result, and searching the cells.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A downlink signal configuring method, a synchronization method, devices thereof, and a cell search method using the same in a mobile communication system will be described with reference to drawings.

Figure 1:
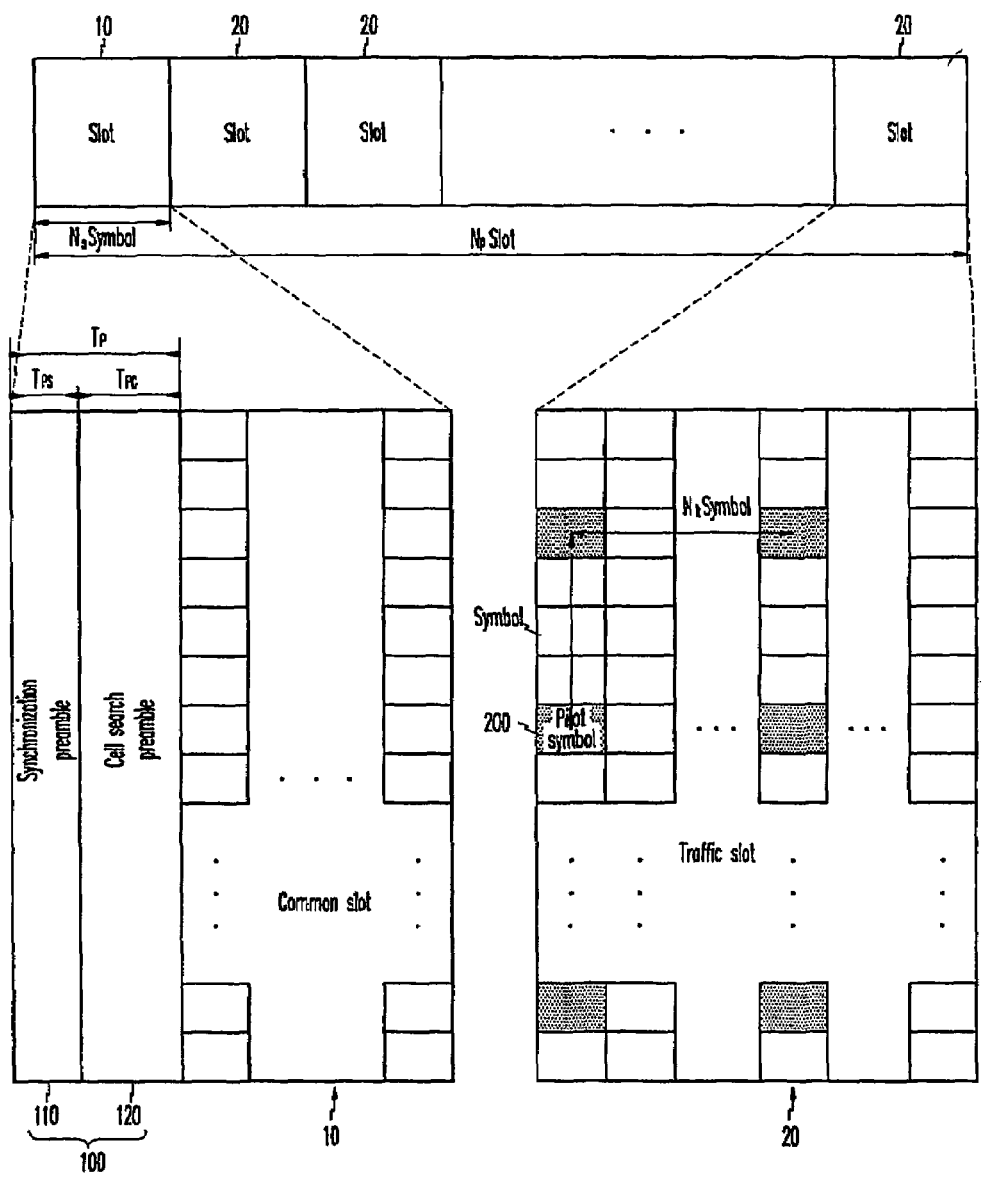
FIG. 1 shows a brief structural diagram of a frame of a downlink signal in an OFDMA-based mobile communication system according to a first preferred embodiment of the present invention.

With reference to FIG. 1, the structure of a preamble and a pilot in the mobile communication system according to the first preferred embodiment of the present invention will be described in detail.

FIG. 1 shows a brief structural diagram of a frame of a downlink signal in an OFDMA-based mobile communication system according to a first preferred embodiment of the present invention.

As shown in FIG. 1, the frame of the downlink signal comprises $N_p$ slots 10 and 20, and one slot 10 and 20 includes $N_s$ symbols. One slot 10 from among the $N_p$ slots 10 and 20 is a common slot, and residual $N_p-1$ slots 20 are traffic slots.

A preamble 100 is provided at the beginning part of the common slot 10, and the preamble 100 includes a synchronization preamble 110 having a length of $T_{PS}$ and a cell search preamble 120 having a length of $T_{PC}$ ($=T_P-T_{PS}$). The synchronization preamble 110 has a structure suitable for time and frequency synchronization, and the cell search preamble 120 has a structure appropriate for cell search. The common slot 10 can further comprise a channel for transmitting common cell information, and a pilot symbol for the channel in addition to the preamble 100. The traffic slot 20 includes a pilot symbol given with respect to the time axis and the frequency axis. The pilot symbol 200 is inserted per group of $N_f$ subcarriers with respect to the frequency axis and per group of $N_t$ symbols with respect to the time axis.

Referring to FIGS. 2A to 10, a synchronization and cell search method according to the first preferred embodiment of the present invention will be described.

First, the synchronization and cell search method according to the first preferred embodiment of the present invention will be described with reference to FIGS. 2A and 2B.

Figure 2A:
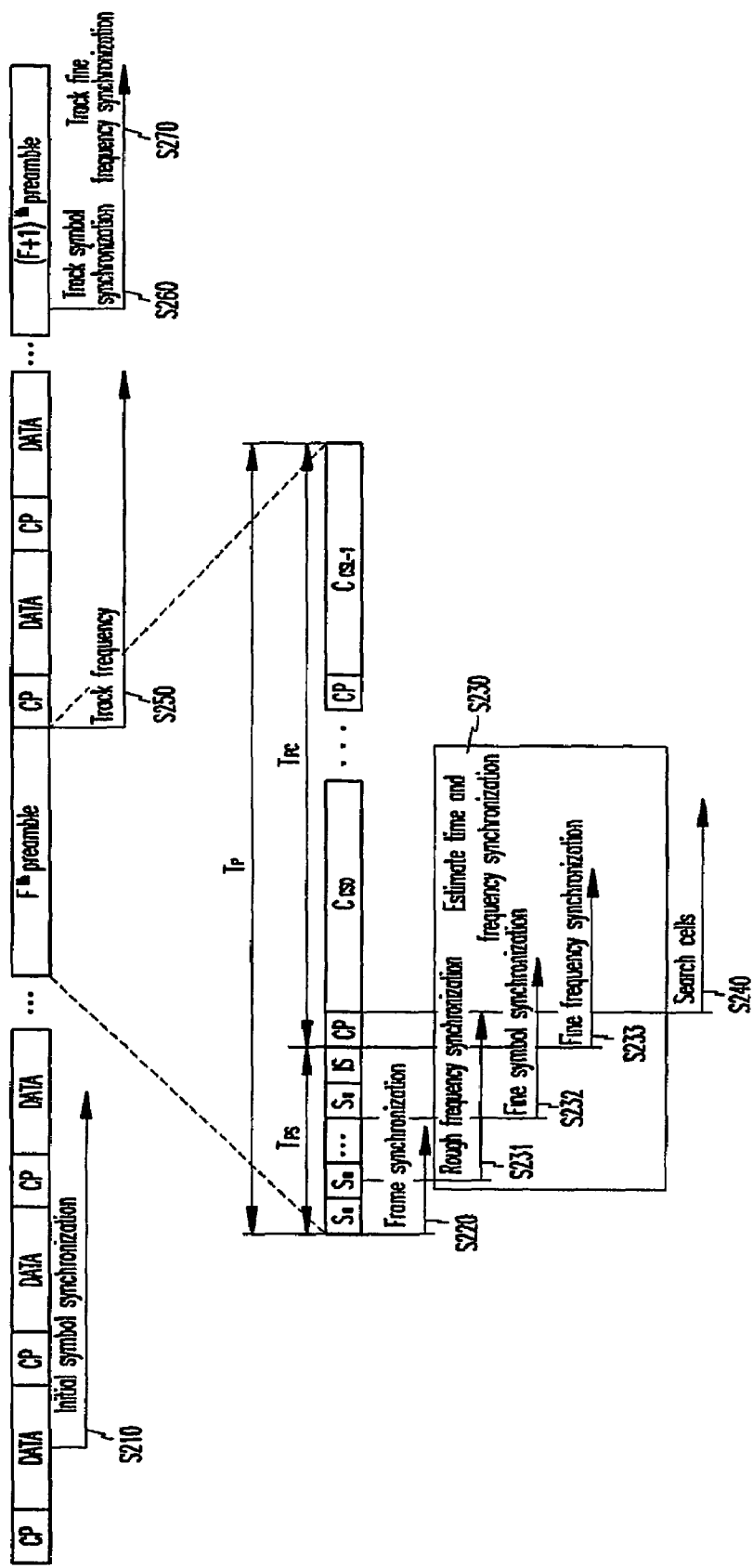
FIG. 2A shows a brief structural diagram of a downlink signal in an OFDMA-based mobile communication system according to a first preferred embodiment of the present invention.
Figure 2B:
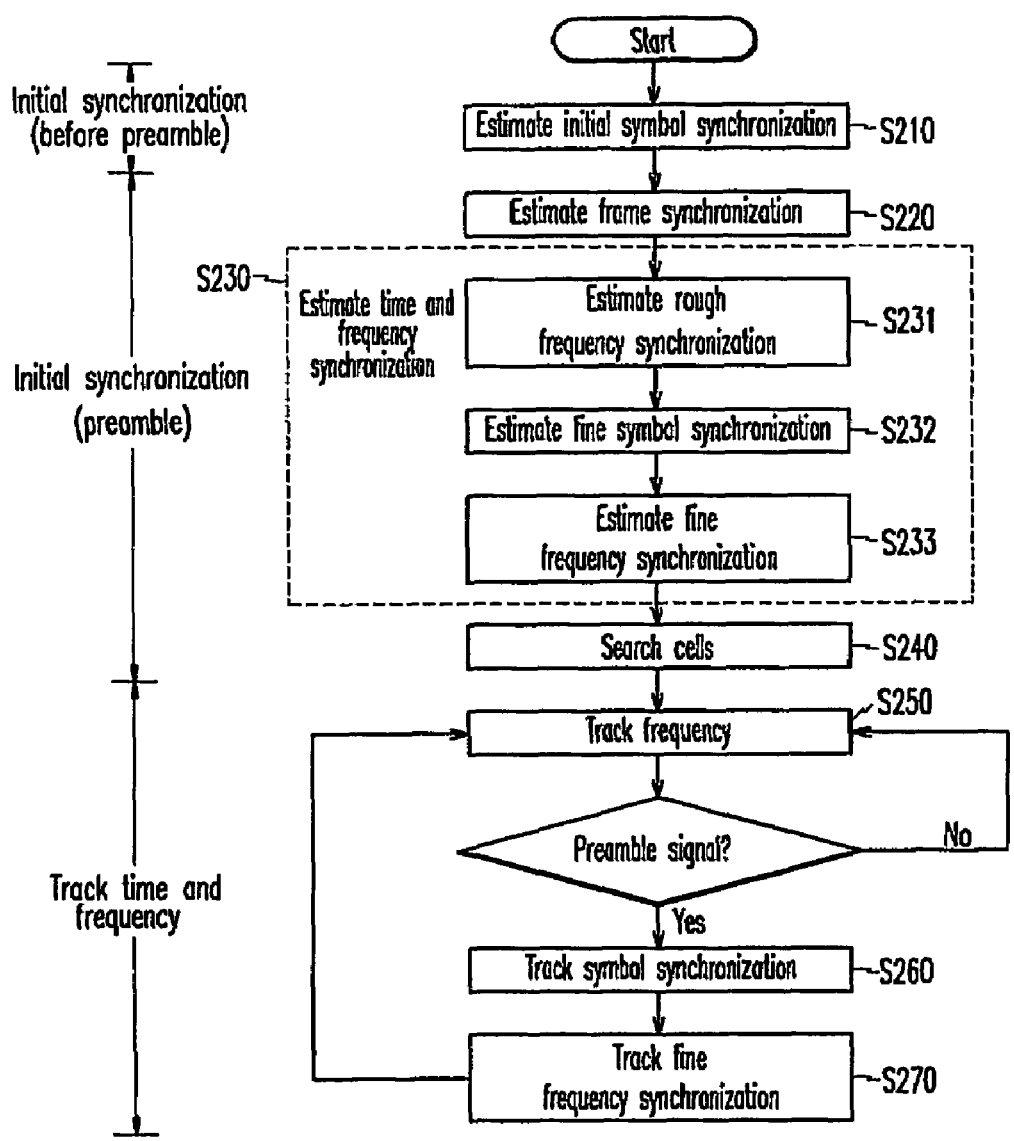
FIG. 2B shows a flowchart for a synchronization and cell search method according to a first preferred embodiment of the present invention.

FIG. 2A shows a brief structural diagram of a downlink signal in an OFDMA-based mobile communication system according to a first preferred embodiment of the present invention, and FIG. 2B shows a flowchart for a synchronization and cell search method according to a first preferred embodiment of the present invention.

As shown in FIGS. 2A and 2B, for the purpose of initial synchronization, a CP (cyclic prefix) of an OFDM transmit signal is used to estimate initial symbol synchronization in step S210. The estimated initial symbol synchronization and the synchronization preamble 110 of the preamble 100 are used to estimate frame synchronization in step S220. Next, the synchronization preamble 110 of the preamble 100 and the cell search preamble 120 are used to estimate the time and frequency synchronization in step S230. When the time and frequency synchronization is performed in the previous step S230, the cell search preamble 120 is used to estimate cell search in step S240. The initial synchronization is accordingly performed through the steps of S210 to S240.

The time and frequency synchronization in the previous step S230 can be controlled through subsequent steps of S231 to S233. That is, the synchronization preamble 110 is used to estimate a frequency offset, and brief frequency synchronization is estimated in step S231. The synchronization preamble 110 is used to estimate fine symbol synchronization in step S232, and the cell search preamble 120 is used to estimate fine frequency synchronization in step S233. Accordingly, the time and frequency is synchronized.

Frequency and time are tracked when the initial synchronization is performed. In order to track the frequency and time, a phase difference between a CP of the OFDM transmit signal and a valid OFDM symbol (a transmit symbol) including the CP is used to track the frequency in step S250. Next, the synchronization preamble 110 is used to track the symbol synchronization in step S260, and the cell search preamble 120 is used to track fine frequency synchronization in step S270.

The synchronization and cell search method described with FIGS. 2A and 2B will be described in detail referring to FIGS. 3 to 10.

Figure 3:
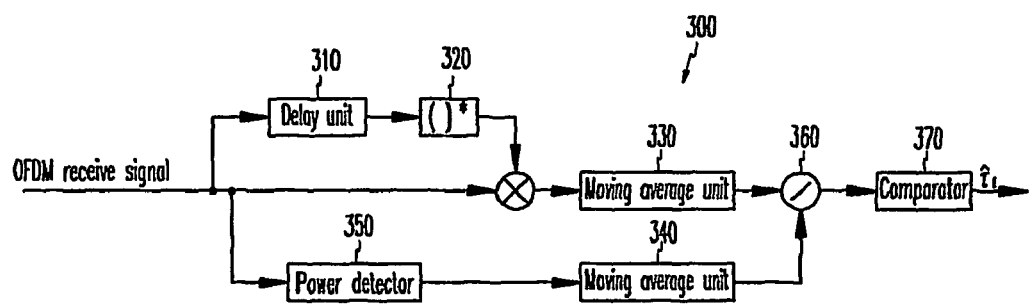
FIG. 3 shows a brief block diagram for an initial symbol synchronization estimator according to a first preferred embodiment of the present invention.

Referring to FIG. 3, a method for estimating synchronization of an initial symbol in the synchronization and cell search method according to the first preferred embodiment will be described in detail. FIG. 3 shows a brief block diagram for an initial symbol synchronization estimator according to the first preferred embodiment of the present invention.

As shown in FIG. 3, the initial symbol synchronization estimator 300 comprises a delay unit 310, a correlator 320, moving average units 330 and 340, a power detector 350, a normalizer 360, and a comparator 370.

An OFDM receive signal y(n+l+N) is delayed by the delay unit 310 by the length N of the valid OFDM symbol, and the delayed signal y(n+l) is correlated by the correlator 320. The moving average unit 330 calculates a correlation value $y^*(n+l)$ of the delayed signal and a moving average value $$\sum_{l=0}^{N_{CP}-1} y^*(n+l)y(n+l+N)$$

of the received signal y(n+l+N), and the moving average unit 340 calculates a moving average value $$\sum_{l=0}^{N_{CP}-1} |y(n+l+N)|^2$$

of a signal power detected by the power detector 350. The moving average value $$\sum_{l=0}^{N_{CP}-1} y^*(n+l)y(n+l+N)$$

is normalized into a moving average value $$\sum_{l=0}^{N_{CP}-1} |y(n+l+N)|^2.$$

A timing n for maximizing the normalized correlation value is determined as a symbol timing $\hat{\tau}_m$ by the comparator 370, and the initial symbol synchronization is estimated.

That is, a position for maximizing an autocorrelation of the CP of the OFDM symbol and the valid OFDM symbol during a single OFDM symbol period is estimated in the initial symbol synchronization. Performance of the initial symbol synchronization is improved when the above-described estimation process is repeatedly performed on M symbols. The symbol timing $\hat{\tau}_m$ estimated by the initial symbol synchronization device 300 and the symbol timing $\hat{\tau}_l$ repeatedly estimated by M times are given in Equation 1. The initial symbol synchronization device 300 can be realized as software in one of/both of dedicated hardware and a universal processor.

$$\hat{\tau}_m = \max_n \left\{ \left| \sum_{l=0}^{N_{CP}-1} y^*(n+l)y(n+l+N) \right| \bigg/ \sum_{l=0}^{N_{CP}-1} |y(n+l+N)|^2 \right\},$$

$$0 \le n \le N_{sym}, \text{ and } \hat{\tau}_l = \frac{\sum_{m=0}^{M-1} \hat{\tau}_m}{M}$$

Equation 1 where $\hat{\tau}_m$ is a symbol timing, $\hat{\tau}_l$ is a symbol timing repeatedly estimated by M times, $N_{sym}$ is a length of an OFDM symbol, y(n) is an OFDM receive signal, $N_{CP}$ is a length of a CP of an OFDM symbol, and N given as $N_{sym}-N_{CP}$ is a length of a valid OFDM symbol of an OFDM symbol.

Figure 4:
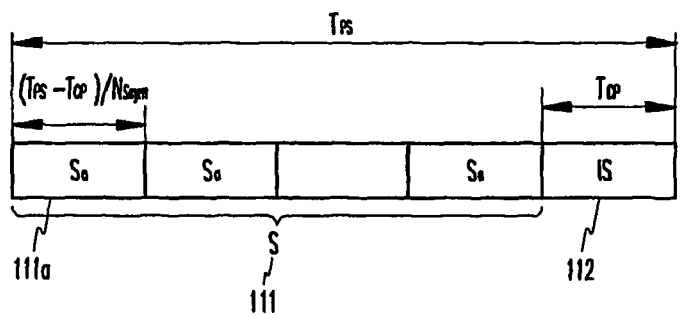
FIG. 4 shows a brief block diagram of a preamble of a downlink signal in an OFDMA-based mobile communication system according to a first preferred embodiment of the present invention.
Figure 5:
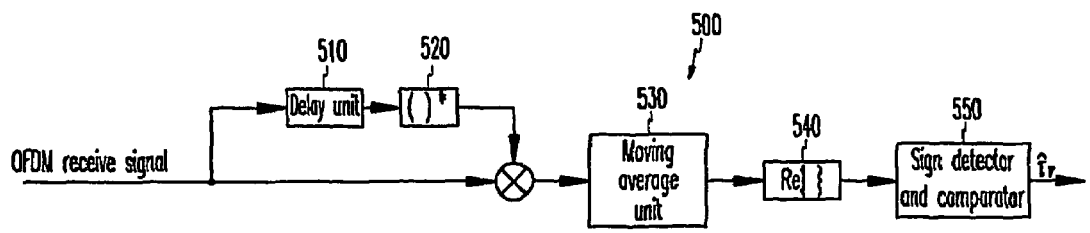
FIG. 5 shows a brief block diagram for a frame synchronization estimator according to a first preferred embodiment of the present invention.

Referring to FIGS. 4 and 5, a method for estimating frame synchronization in the synchronization and cell search method according to the first preferred embodiment of the present invention will be described.

FIG. 4 shows a brief block diagram of a preamble of a downlink signal in an OFDMA-based mobile communication system according to a first preferred embodiment of the present invention, and FIG. 5 shows a brief block diagram for a frame synchronization estimator according to a first preferred embodiment of the present invention.

As shown in FIG. 4, the synchronization preamble 110 includes an S symbol 111 and an IS' symbol 112, and has a length of $T_{PS}$. $T_{PS}$ corresponds to a length of an OFDM symbol, and the S symbol 111 is a valid OFDM symbol length of $T_{PS}-T_{CP}$ excluding the length $T_{CP}$ of the CP of the OFDM transmit signal. The IS' symbol 112 has a length of $T_{CP}$ which corresponds to the CP of the OFDM transmit signal, and the IS' symbol is obtained by rotating the S symbol 111 by 180° and taking a top portion which corresponds to the length $T_{CP}$ of the CP from the rotated S symbol.

The above-described structure of the synchronization preamble 110 is suitable for initial synchronization of the frequency and time of the downlink signal in the OFDMA-based mobile communication system. Since the S symbol 111 and the IS' symbol 112 are configured to have a phase difference of 180°, the real number part of the autocorrelation of the S symbol 111 and the IS' symbol 112 has a negative sign. When the autocorrelation of the same type as that of the synchronization preamble 110 is applied to the consecutively transmitted OFDM symbol except for the synchronization preamble 110, the real number part of the autocorrelation has a positive sign. Therefore, the timing of the frame is estimated through a simple calculation using the synchronization preamble 110.

The S symbol 111 has $N_{Ssym}$-times-repeated Sa symbols 111a. A frequency offset normalized at intervals of subcarriers of a range of from $-N_{Ssym}/2$ to $N_{Ssym}/2$ can be estimated by using a phase value of the autocorrelation in the time domain. Also, since the synchronization preamble 110 includes an S symbol 111 and an IS' symbol 112, fine symbol synchronization (accurate timing of a symbol, and accurate symbol timing) can be estimated by finding cross correlation or autocorrelation of the S symbol 111 and the IS' symbol 112.

Referring to FIG. 5, a frame synchronization estimator 500 comprises a delay unit 510, a correlator 520, a moving average unit 530, a real number unit 540, and a sign detector and comparator 550.

In the frame synchronization estimator 500, an OFDM receive signal y(n+l+N) is delayed by the delay unit 510 by a length N of a valid OFDM symbol, and a correlation value of the delayed signal y(n+l) is determined by the correlator 520. The correlation value $y^*(n+l)$ of the delayed signal and a moving average value fn of the receive signal y(n+l+N) are calculated by the moving average unit 530. The sign detector and comparator 550 detects a sign of the real number part Re{$f_n$} of a moving average value determined by the real number unit 540, and compares absolute values. As described above, the autocorrelation of the S symbol 111 and the IS' symbol 112 of the synchronization preamble 110 has a real number unit of a negative sign, the sign of the real number part Re{$f_n$} becomes −1, and the timing n with the maximum absolute value is determined to be a frame timing $\hat{\tau}_F$. The moving average value fn and the frame timing $\hat{\tau}_F$ determined by the frame synchronization estimator 500 are given as Equation 2. The frame synchronization estimator 500 can be realized as software in one of/both of dedicated hardware and a universal processor.

$$f_n = \sum_{l=0}^{N_{CP}-1} y^*(n+l)y(n+l+N)$$

$$\Gamma_n \text{sign}(\text{Re}\{f_n\}), \quad \text{sign}(p) = \begin{cases} 1 & \text{if } p \ge 0 \\ -1 & \text{if } p < 0 \end{cases}$$

$$\hat{\tau}_F = \max_{n, \Gamma_n = -1} |f_n|$$

Equation 2 where $N_{CP}$ is a length of a CP of an OFDM symbol, and N given as $N_{sym}-N_{CP}$ is a length of a valid OFDM symbol of an OFDM symbol.

Figure 6:
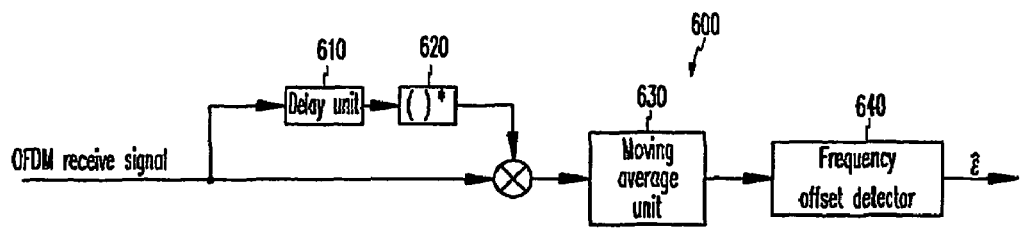
FIG. 6 shows a brief block diagram for a frequency synchronization estimator according to a first preferred embodiment of the present invention.
Figure 7:
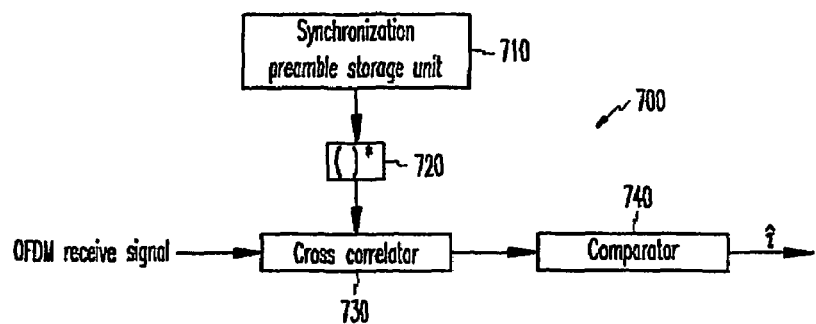
FIG. 7 shows a brief block diagram for a symbol synchronizer according to a first preferred embodiment of the present invention.

Referring to FIGS. 6 and 7, a method for estimating frequency synchronization in the synchronization and cell search method according to the first preferred embodiment of the present invention will be described.

FIG. 6 shows a brief block diagram for a frequency synchronization estimator according to a first preferred embodiment of the present invention, and FIG. 7 shows a brief block diagram for a symbol synchronizer according to a first preferred embodiment of the present invention.

As described in FIGS. 2A and 2B, the method estimating frequency synchronization includes a rough frequency synchronization process using the repeated feature of the S symbol 111 of the synchronization preamble 110, and a fine frequency synchronization process using a CP of the cell search preamble 120. The frequency synchronization in both processes is estimated by using a phase difference between the same signals which are transmitted at intervals of a predetermined time.

Referring to FIG. 6, a brief method for estimating frequency synchronization will be described. A frequency synchronization estimator 600 comprises a delay unit 610, a correlator 620, a moving average unit 630, and a frequency offset detector 640.

An OFDM receive signal y(n+l+D) is delayed by a time difference D repeated by the delay unit 610, and a correlation value of the delayed signal y(n+l) is determined by the correlator 620. The correlation value y*(n+l) of the delayed signal and a moving average value $$\sum_{l=0}^{L-1} y^*(n+l)y(n+l+D)$$

of the receive signal y(n+l+D) are calculated by the moving average unit 630. The frequency offset detector 640 detects a phase of the moving average value, finds a frequency offset $\hat{\epsilon}$, and estimates a rough frequency synchronization. The frequency offset $\hat{\epsilon}$ is given as Equation 3. The frequency synchronization estimator 600 can be realized as software in one of/both of dedicated hardware and a universal processor. It is defined in the brief frequency synchronization process that $D=N/N_{Ssym}$.

$$\hat{\epsilon} = \frac{N}{2\pi D}\arg\left[\sum_{l=0}^{L-1} y^*(n+l)y(n+l+D)\right] \quad \text{Equation 3}$$

where L is an averaged number of times, and D is a time difference of between repeated signals.

Next, referring to FIG. 7, a method for estimating fine symbol synchronization will be described. A fine symbol synchronization estimator 700 comprises a synchronization preamble storage unit 710, a correlator 720, a cross correlator 730, and a comparator 740. The cross correlator 730 cross-correlates an OFDM receive signal y(n+l) with a pattern x(l) (which is correlated by the correlator 720) of a synchronization preamble stored in the synchronization preamble storage unit 710. The comparator 740 detects the timing n for maximizing the cross correlation value as a symbol timing $\hat{\tau}$ which is given in Equation 4. That is, the fine symbol synchronization is estimated by cross-correlating the OFDM receive signal with the pattern of the synchronization preamble, and detecting the timing n having the maximum value. The fine symbol synchronization estimator 700 can be realized as software in one of/both of dedicated hardware and a universal processor. Equation 4 expresses an exemplified method for estimating the symbol synchronization.

$$\hat{\tau} = \max_n \left|\sum_{l=0}^{L-1} x^*(l)y(n+l)\right| \quad \text{Equation 4}$$

where $\hat{\tau}$ is a symbol timing, and L is a length of cross correlation.

Next, referring to FIGS. 8 to 10, a cell search method in the synchronization and cell search method according to the first preferred embodiment of the present invention will be described.

Figure 8:
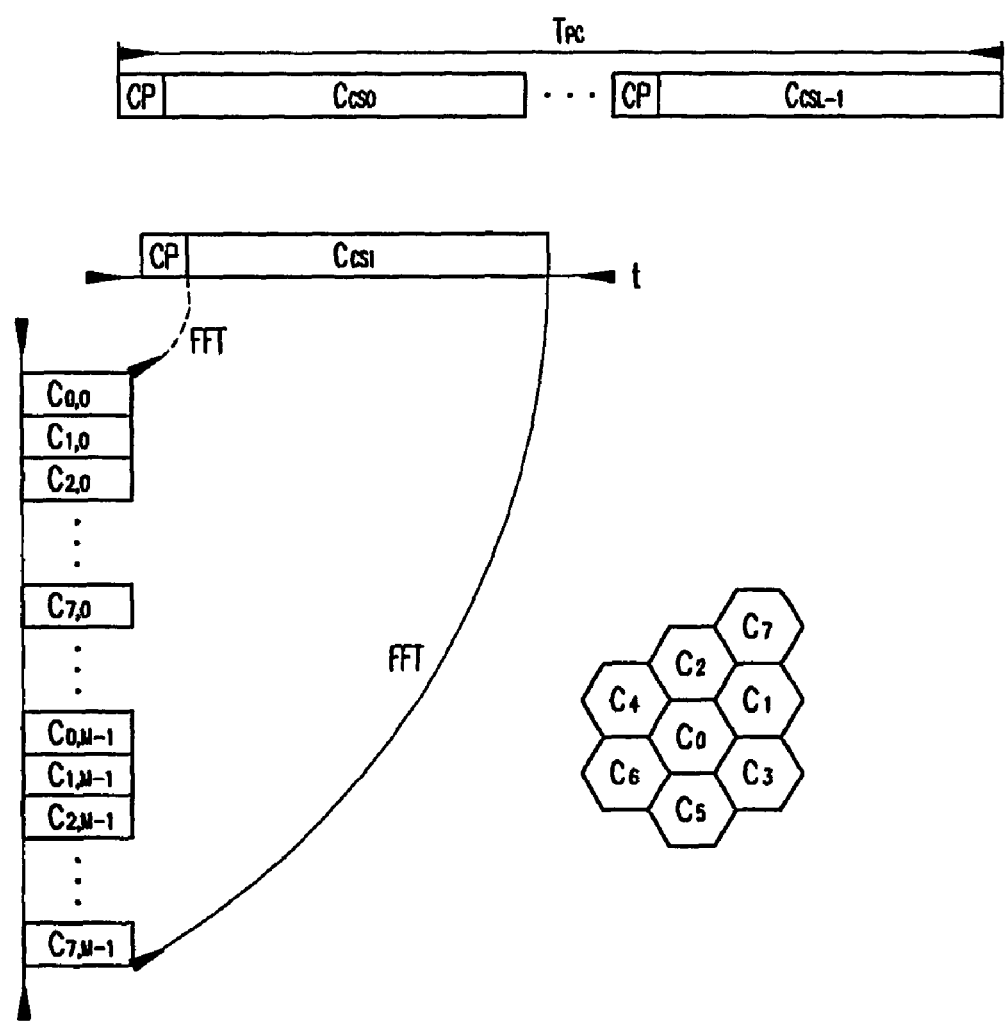
FIG. 8 shows a brief structural diagram of a cell search preamble of a downlink signal in an OFDMA-based mobile communication system according to a first preferred embodiment of the present invention.
Figure 9:
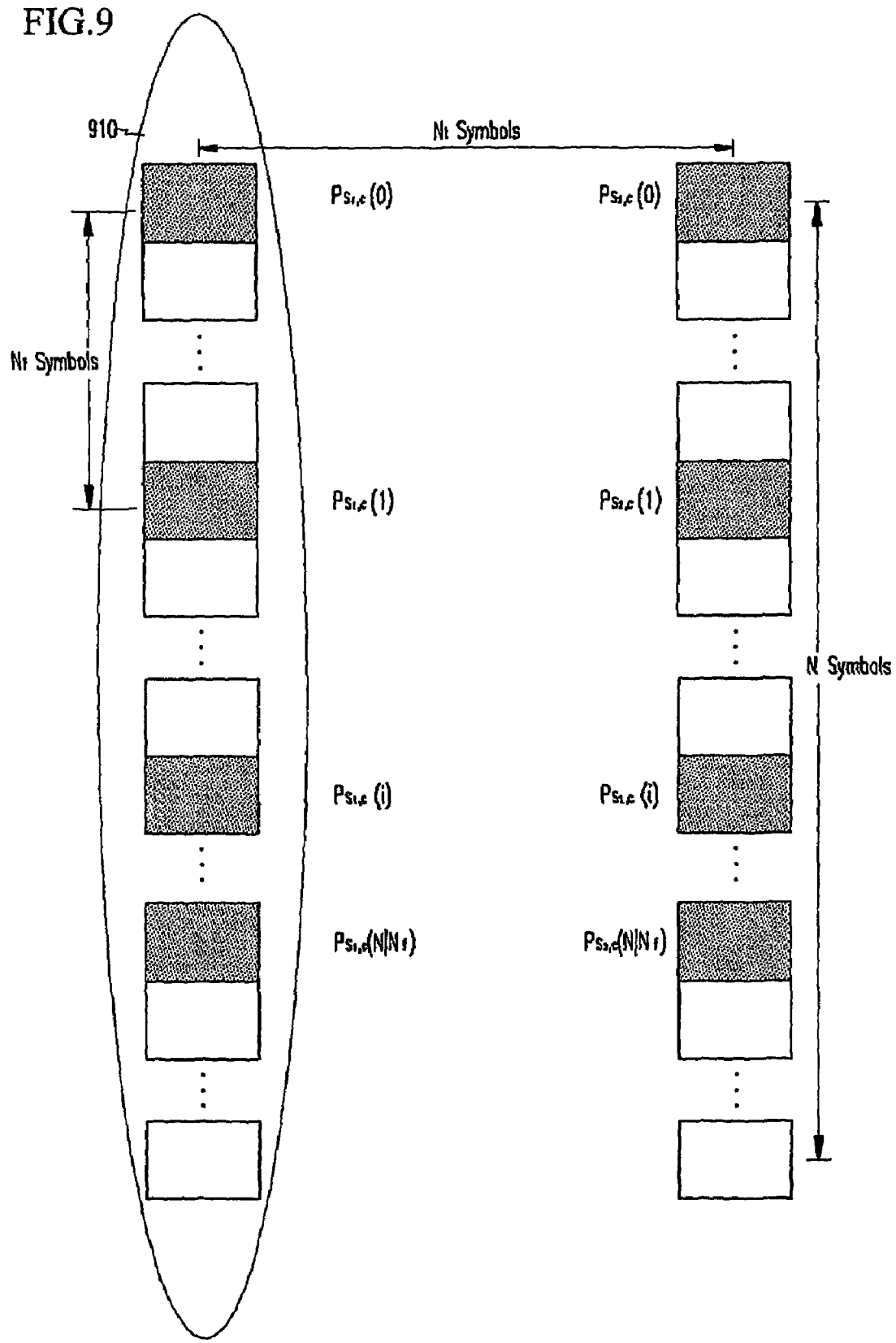
FIGS. 9 and 10 show patterns of pilots of downlink signals in an OFDMA-based mobile communication system according to preferred embodiments of the present invention.
Figure 10:
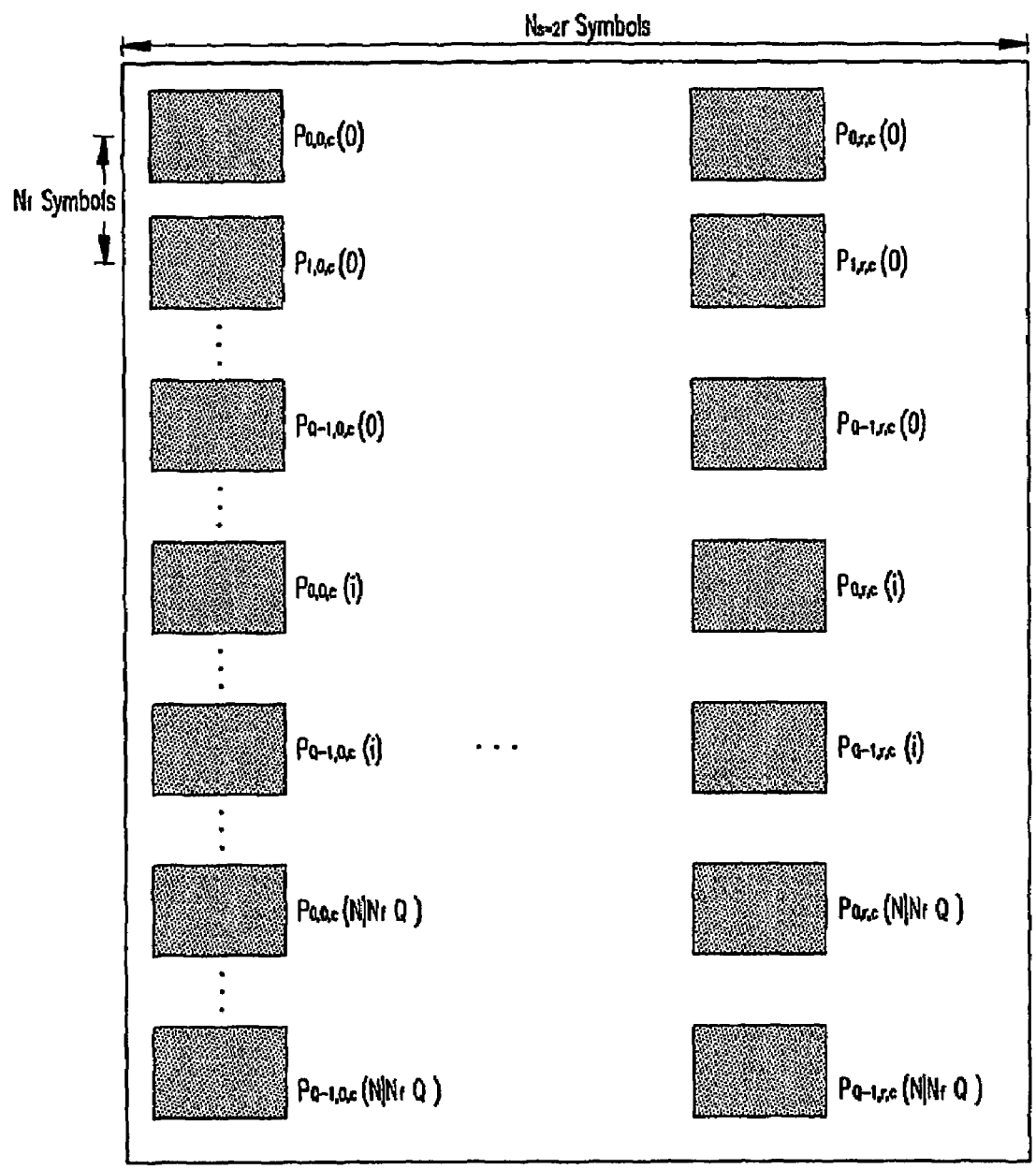

FIG. 8 shows a brief structural diagram of a cell search preamble of a downlink signal in an OFDMA-based mobile communication system according to a first preferred embodiment of the present invention, and FIGS. 9 and 10 show patterns of pilots of downlink signals in an OFDMA-based mobile communication system according to preferred embodiments of the present invention.

As shown in FIG. 8, the cell search preamble 120 according to the first preferred embodiment has a length of $T_{PC}$, and specific patterns for respective cells. When $8^L$ cell categories are provided and $T_{PC}$ is the same length as that of L OFDM symbols in the OFDMA-based mobile communication system as an example, the defined pattern is transmitted to the $(C^c_{k,m})^{th}$ (m=0, ..., M−1) subcarrier from among the eight different orthogonal patterns on the frequency axis of the $k^{th}$ symbol, according to the cell number $$C = \sum_{k=1}^{L} 8^{L-k} c_k.$$

The terminal finds $c_k$ (k=1, ..., L−1) for maximizing the receive power received from the $(C_{c_k,m})^{th}$ (m=0, ..., M−1) subcarrier, and tracks the cells. In this instance, one of the $8^L$ cells can be selected by performing cross correlation calculation on the eight patterns L times.

As another example, when $8^2$(=64) cell categories are provided and $T_{PC}$ is the same length as that of one OFDM symbol in FIG. 8, the defined pattern is transmitted to the $(C_{c_1,m})^{th}$ subcarrier according to the cell number $C=8c_1+c_2$. In this instance, a cell search preamble for allowing the terminal to search the cells can be formed by loading the $c_2^{th}$ progression on the transmitted subcarrier from among the progressions which have a length of M and good cross correlation features. In this instance, one of the 64 cells is selected by finding $c_1$ for maximizing the summation of powers on the eight subcarrier sets following $c_1$, and finding the cross correlation on the corresponding subcarrier sets according to the eight patterns.

As described, in the cell search preamble set including a plurality of cell search preambles 120 classified according to a transmitted time, transmitted subcarriers, and signal patterns, a specific cell search preamble 120 is allocated to each cell when the number of cells in the mobile communication system is less than the number of the cell search preambles 120, and the cells are grouped by the number of the cell search preambles 120 and a specific cell search preamble 120 is allocated for each cell when the number of cells is greater than the number of the cell search preambles 120. Also, in the two different cell search preambles 120, when one cell search preamble 120 transmits signals through a subcarrier, another cell search preamble 120 does not transmit the signals through the same subcarrier in at least one of the symbols through which the cell search preambles 120 are transmitted.

Also, in order to increase the number of specific cell search preambles 120, the cell search preambles 120 are grouped, and when one cell search preamble 120 transmits signals through a subcarrier, another cell search preamble 120 does not transmit the signals through the same subcarrier in at least one of the symbols through which the cell search preambles 120 are transmitted in the two different cell search preambles 120 as described above, and a same subcarrier is used for the same transmit symbol, arid signal patterns which can be distinguished by using a predefined receive signal processing method are allocated in the two different cell search preambles 120 belonging to the same group.

Referring to FIGS. 9 and 10, a pilot pattern will be described in detail.

FIG. 9 shows a case when the number of total subcarriers is N, a subcarrier interval of a pilot symbol is $N_f$, and a time interval of the pilot symbol is $N_t$. In this instance, the number of pilot symbols each of which is inserted for each group of $N_f$ subcarriers at the $s_1{}^{th}$ symbol 910, and the pilot symbols respectively have a pattern $P_{s_1,c}(i)$ where c is a cell number, i is the $i^{th}$ pilot subcarrier in the $s_1{}^{th}$ OFDM symbol, and the pattern $P_{s_1,c}(i)$ can be varied according to c and s. Therefore, the slot synchronization and the frame synchronization are estimated and the cells are searched by using a specific pilot pattern for each cell and finding a cross correlation on the available pattern.

As described, a set of pilot patterns which can be distinguished according to signal patterns transmitted to the subcarriers of the transmit symbols for transmitting the pilot symbols, and when the number of cells in the mobile communication system is less than the number of pilot patterns, a specific pilot pattern is allocated to each cell, and when the number of cells is greater than the number of pilot patterns, the cells are grouped by the number of pilot patterns, and different pilot patterns are allocated in a single group.

FIG. 10 shows a case in which a time interval $N_t$ of a pilot is given as r, and a pattern $P_{s,c}(i)$ is configured to be a combination of Q patterns, that is, $P_{s,c}(iQ+q)=P_{q,s,c}(i)$, $q=0, \ldots, Q-1$ when a slot has $2r(=N_S)$ OFDM symbols in the pilot pattern of FIG. 9. In this instance, $Q_1$ patterns from among the Q patterns are used in common by all the cells, and residual $Q_2(=Q-Q_1)$ patterns are defined to be different for the respective cells. Accordingly, the slot synchronization is found with a lesser amount of calculation by using the $Q_1$ common patterns, and the cells are searched by using the residual $Q_2$ patterns or a preamble.

Figure 11A:
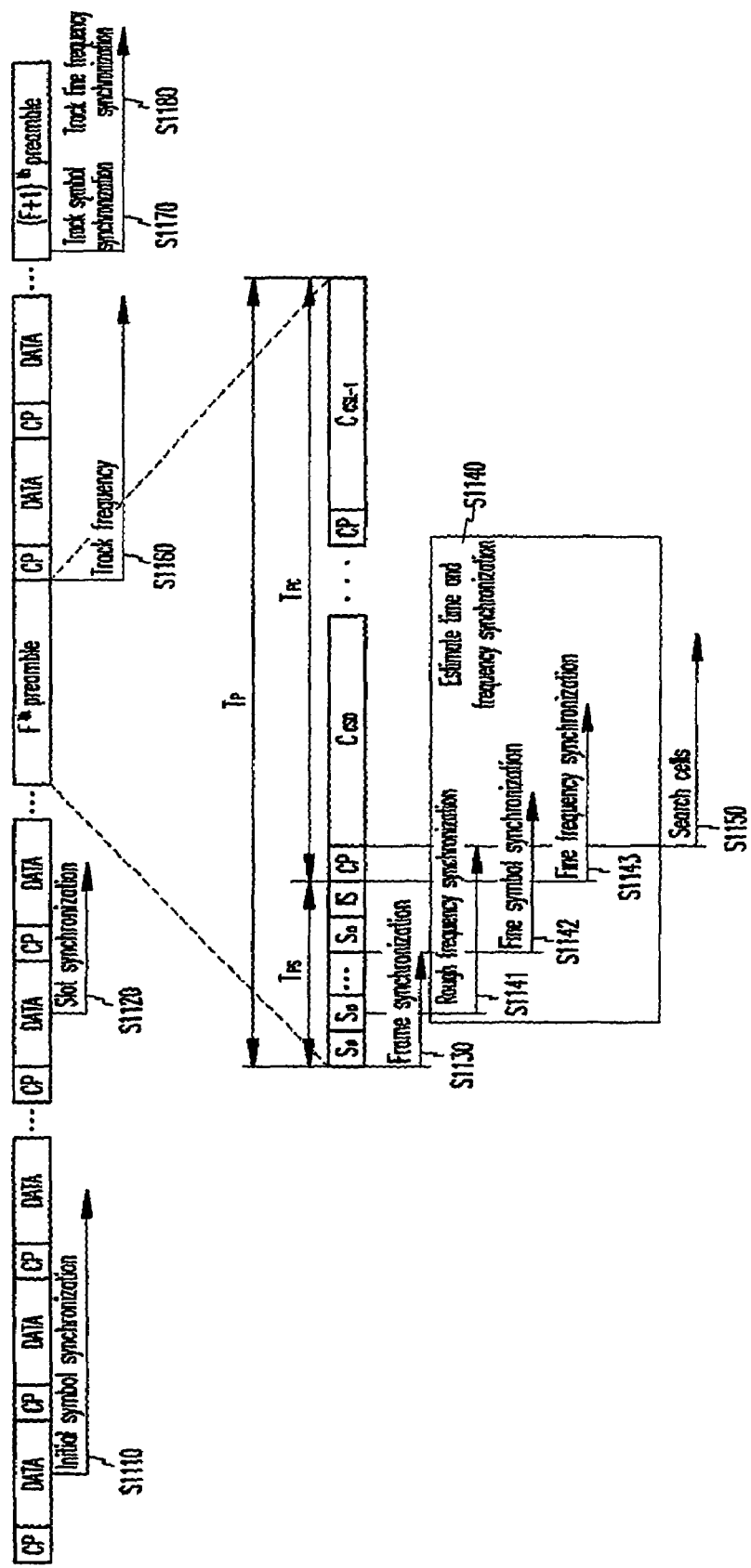
FIG. 11A shows a brief structural diagram of a downlink signal in an OFDMA-based mobile communication system according to a second preferred embodiment of the present invention.
Figure 11B:
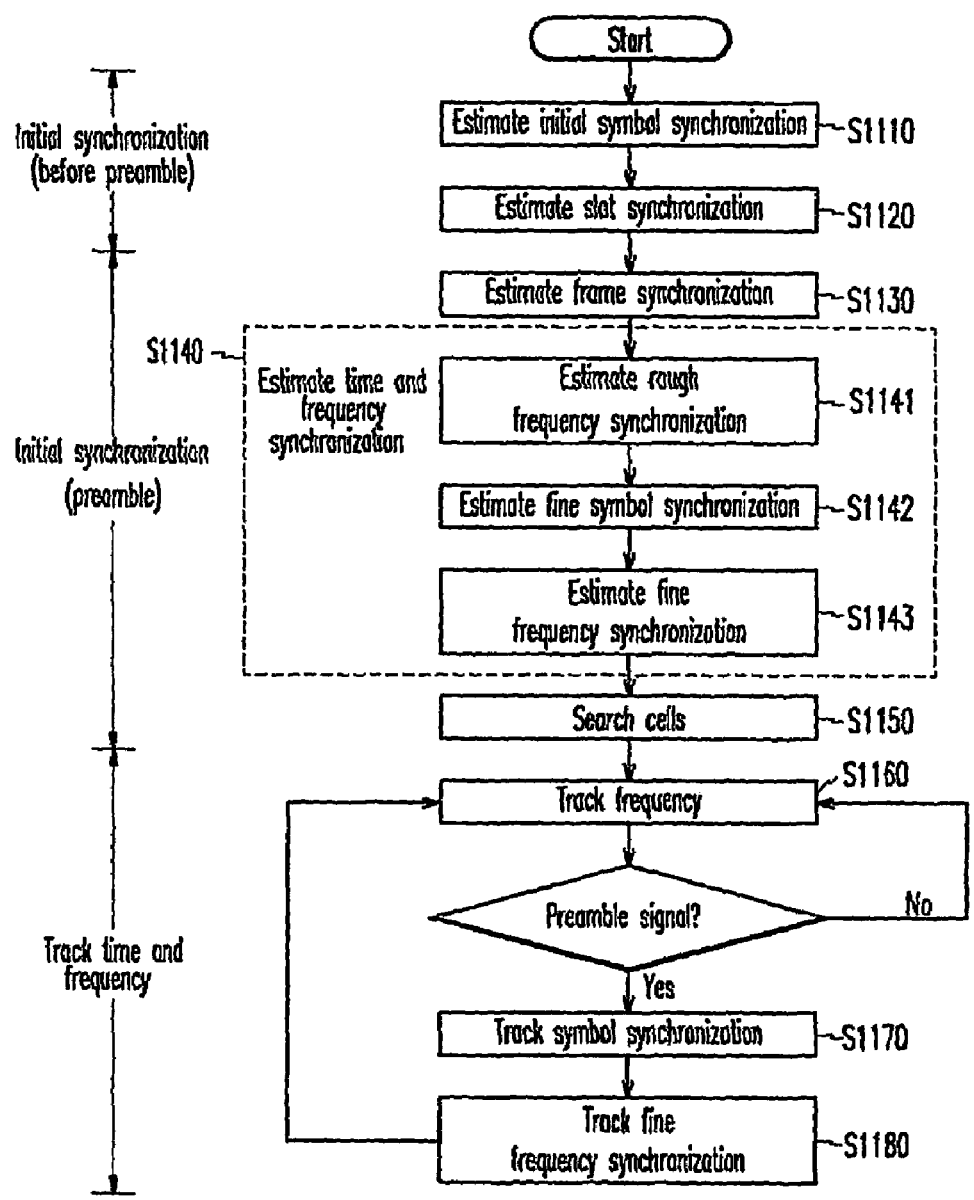
FIG. 11B shows a flowchart for a synchronization and cell search method according to a second preferred embodiment of the present invention.
Figure 12:
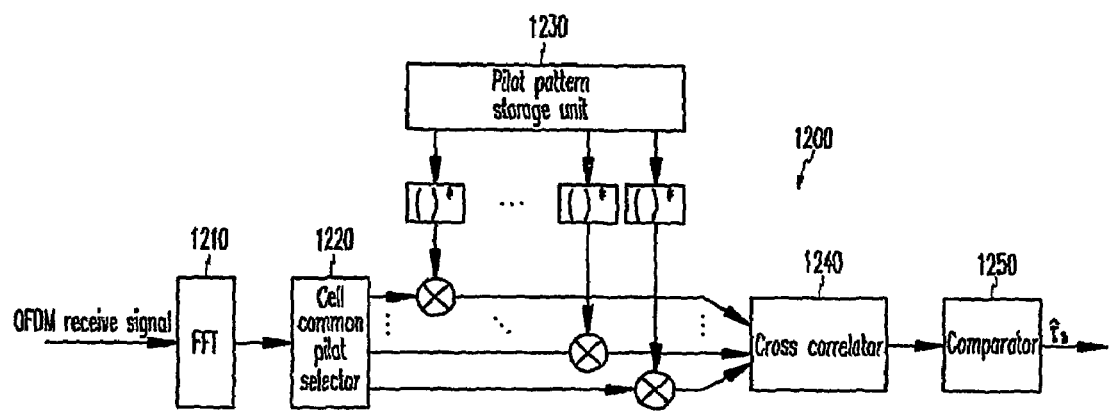
FIG. 12 shows a brief block diagram for a slot synchronization estimator according to a second preferred embodiment of the present invention.

Referring to FIGS. 11A, 11B, and 12, a method of using the pilot pattern shown in FIG. 10 in the downlink signal of the OFDMA-based mobile communication system having the same structure as that of FIG. 1 will be described in detail.

First, a synchronization and cell search method according to a second preferred embodiment of the present invention will be described with reference to FIGS. 11A and 11B.

FIG. 11A shows a brief structural diagram of a downlink signal in an OFDMA-based mobile communication system according to a second preferred embodiment of the present invention, and FIG. 11B shows a flowchart for a synchronization and cell search method according to a second preferred embodiment of the present invention.

For the purpose of initial synchronization, a CP of an OFDM transmit signal is used to estimate initial symbol synchronization in step S1110. The estimated symbol synchronization and a pattern of a pilot in common for each cell are used to estimate slot synchronization in step S1120. The estimated slot synchronization and a synchronization preamble 110 of the preamble 100 are used to estimate frame synchronization in step S1130. The synchronization preamble 110 of the preamble 100 and the cell search preamble are used to estimate time and frequency synchronization in step S1140. When the time and frequency is synchronized in the previous step S1140, one/both of the cell search preamble 120 and a specific pattern for each cell of the pilot is/are used to search the cells in step S1150. Through the steps of S1110 to S1150, the initial synchronization is performed.

In this instance, the step S1140 of estimating the time and frequency synchronization is performed through steps S1141 to S1143. In detail, the synchronization preamble 110 of the preamble 100 is used to estimate the frequency offset and estimate rough frequency synchronization in step S1141. The synchronization preamble 110 of the preamble is used to estimate fine symbol synchronization in step S1142, and the cell search preamble 120 is used to estimate fine frequency synchronization in step S1143.

The frequency and time are tracked when the initial synchronization is performed. In order to track the frequency and time, a phase difference between a CP of the OFDM transmit signal and a valid OFDM symbol including the CP is used to track the frequency in step S1160. Next, the synchronization preamble 110 is used to track the symbol synchronization in step S1170, and the synchronization preamble 110 is used to track the frequency synchronization in step S1180. By repeating the steps of from S1160 to S1180, the frequency and the time are tracked.

The synchronization and cell search method according to the second preferred embodiment of the present invention are performed in the same manner of the first preferred embodiment except for the steps of S1120 and S1130. That is, differing from the first preferred embodiment, the symbol synchronization and the pattern of a common pilot for each cell are used to estimate the slot synchronization, and the estimated slot synchronization and the synchronization preamble are used to estimate the frame synchronization.

Referring to FIG. 12, a slot synchronization estimation method in the synchronization and cell search method according to the second preferred embodiment of the present invention will be described in detail. FIG. 12 shows a brief block diagram for a slot synchronization estimator according to the second preferred embodiment of the present invention.

As shown, the slot synchronization estimator 1200 comprises an FFT (fast Fourier transform) unit 1210, a cell common pilot selector 1220, a pilot pattern storage unit 1230, a cross correlator 1240, and a comparator 1250.

The FFT unit 1210 uses an initial timing of the symbol estimated according to the method described with reference to FIG. 3 to perform Fourier transform on the OFDM receive signal, and the cell common pilot selector 1220 selects a common pilot receive signal $Y_{n+lN_s}$ from the Fourier-transformed signal. Next, the cross correlator 1240 cross correlates the correlation value of the cell common pilot pattern $Z(k_m)$ stored in the pilot pattern storage unit 1230 and the common pilot receive signal $Y_{n+lN_s}$. The comparator 1250 selects the symbol position n for maximizing the cross correlation value $\Gamma_{n+lN_s}$ as a slot timing $\hat{\tau}_S$. The slot timing $\hat{\tau}_S$ is given in Equation 5.

$$\Gamma_n = \left| \sum_{m=0}^{M-1} Y_n Z_m^*(k_m) \right| \qquad \text{Equation 5}$$

$$\hat{\tau}_S = \max_n \sum_{l=0}^{L-1} \Gamma_{n+lN_s}, n = 0, \cdots, N_s - 1$$

where $\Gamma_n$ is a cross correlation value, $Y_n$ is a Fourier transformed OFDM receive signal at the n time, $k_m$ is a subcarrier position of an $m^{th}$ cell common pilot, $Z(k_m)$ is the $m^{th}$ cell common pilot, M is the number of the cell common pilots, $\hat{\tau}_S$ is the slot timing, $N_S$ is a symbol number of a slot, and L is a repeated accumulation number of times.

When the channel is changed because of frequency selective attenuation in the band where the cell common pilot is provided in the case of using the slot synchronization estimator shown in FIG. 12, performance of the method following Equation 5 may be degraded. In this case, the cell common pilot is arranged and the cross correlation is found by the method of Equation 6.

$$\Gamma_n = \left| \sum_{m=0}^{M/2-1} Y_n^*(k_{2m}) Y_n(k_{2m+1}) Z_{2m}(k_{2m}) Z_{2m+1}^*(k_{2m+1}) \right| \quad \text{Equation 6}$$

$$\hat{\tau}_S = \max_n \sum_{l=0}^{L-1} \Gamma_{n+lN_s}, n = 0, \cdots, N_s - 1$$

where it is defined that M is an even number, and $k_{2m}$ and $k_{2m+1}$ are arranged within a range in which the channel is not greatly changed. For example, a good cross correlation characteristic is obtained when $Z_{2m}$ and $Z_{2m+1}$ are formed with different sequences and $k_{2m}$ and $k_{2m+1}$ are formed with adjacent frequencies in Equation 6.

As shown in Equation 7 rather than Equation 6, the cross correlation can be found by separately transmitting the cell common pilot at two different times, and using the received signals at the respective times. In this instance, $n_1$ and $n_2$ are arranged within a range in which the channel is not greatly changed.

$$\Gamma_{n_1,n_2} = \left| \sum_{m=0}^{M/2-1} Y_{n_1}^*(k_m) Y_{n_2}(k_m) Z_{2m}(k_m) Z_{2m+1}^*(k_m) \right| \quad \text{Equation 7}$$

$$\hat{\tau}_S = \max_{n_1} \sum_{l=0}^{L-1} \Gamma_{n_1+lN_s, n_2+lN_s}, n_1 = 0, \cdots, N_s - 1$$

Next, a method for using at least one transmit antenna in the downlink of the OFDMA-based mobile communication system will be described with reference to FIGS. 13 to 15.

First, referring to FIGS. 13 and 14, a pilot pattern in a traffic slot of the downlink signal of the OFDMA-based mobile communication system according to the third preferred embodiment of the present invention will be described in detail.

Figure 13:
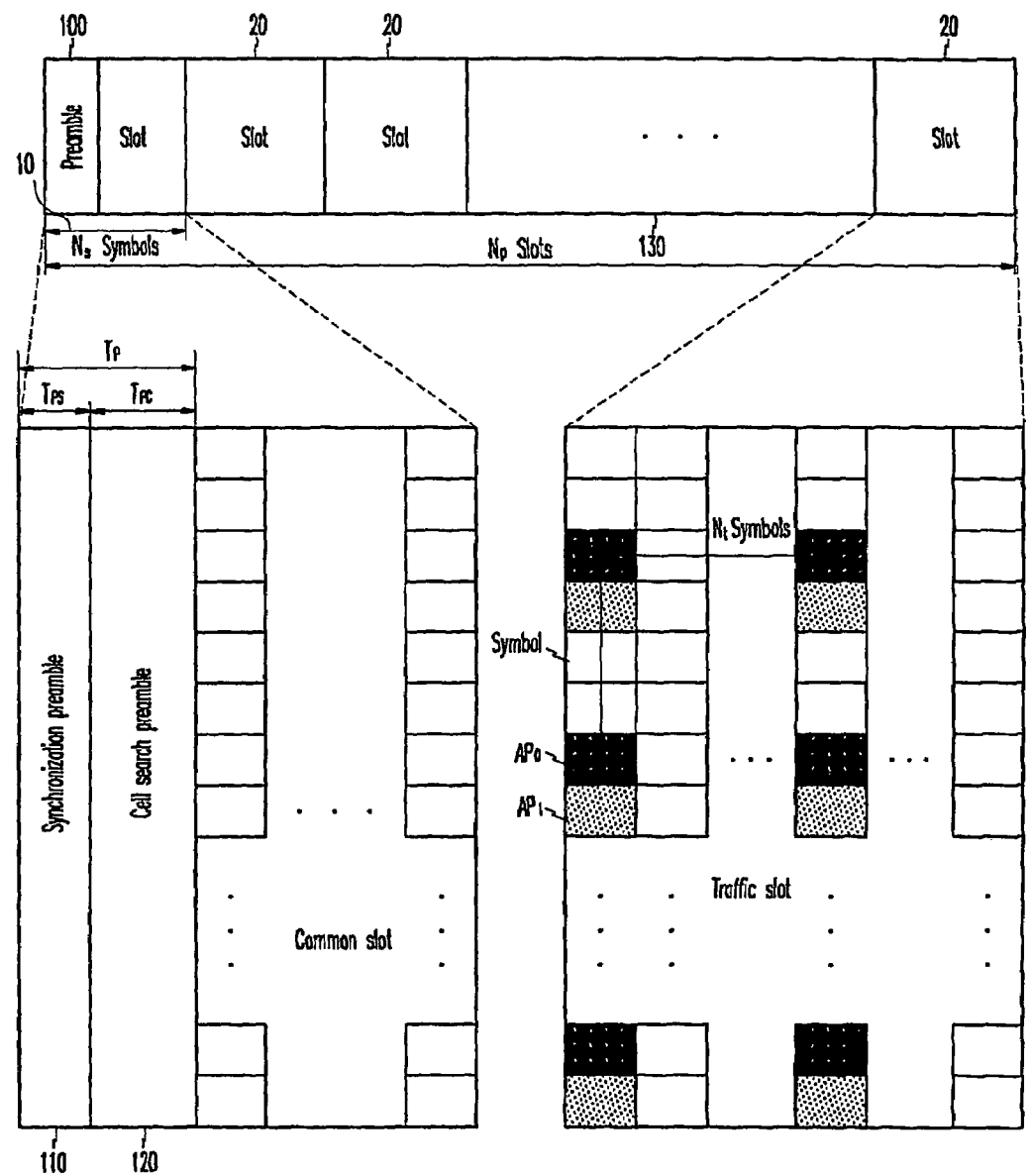
FIG. 13 shows a brief structural diagram for a traffic slot of a downlink signal in an OFDMA-based mobile communication system according to a third preferred embodiment of the present invention.
Figure 14:
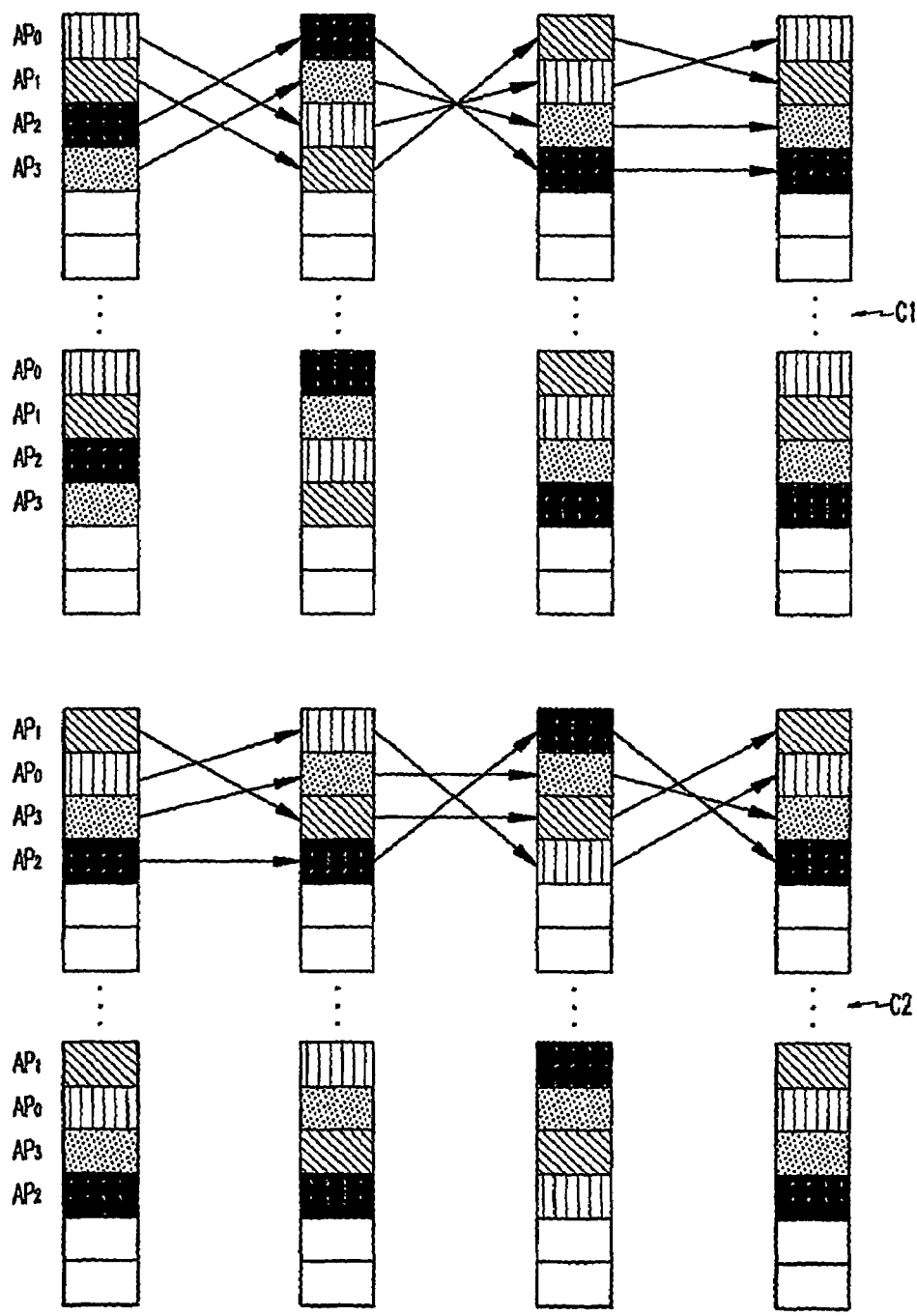
FIG. 14 shows a pattern and a position of the pilot of FIG. 13.

FIG. 13 shows a brief structural diagram for a traffic slot of a downlink signal in an OFDMA-based mobile communication system according to the third preferred embodiment of the present invention, and FIG. 14 shows a pattern and a position of the pilot of FIG. 13.

As shown in FIG. 13, the structure of the downlink signal according to the third preferred embodiment of the present invention corresponds to the structure shown in FIG. 1 except for the traffic slot.

In detail, the common slot 10 includes a preamble 100 having a length of $T_P$, and the preamble 100 includes a synchronization preamble 110 having a length of $T_{PS}$ and a cell search preamble 120 having a length of $T_{PC}(=T_P-T_{PS})$. The synchronization preamble 110 is transmitted to a predefined transmit antenna from among a plurality of transmit antennas, or it is alternately transmitted for a group of several frames. In a like manner, the cell search preamble 120 is transmitted to a predefined transmit antenna from among a plurality of transmit antennas, or it is alternately transmitted for a group of several frames. When the cell search preamble 120 includes at least one OFDM symbol, the cell search preamble 120 is transmitted through a different antenna for each symbol.

In the traffic slot 20, pilot symbols provided on the time axis and the frequency axis for each antenna are respectively inserted for each group of $N_f$ subcarriers on the frequency axis, and for each group of $N_t$ symbols on the time axis. For example, a case of using two antennas is illustrated in FIG. 13. A pilot symbol $AP_0$ of the antenna 0 and a pilot symbol $AP_1$ of the antenna 1 are respectively inserted for each group of $N_f$ subcarriers on the frequency axis and for each group of $N_t$ subcarriers on the time axis. FIG. 13 shows the case of using two antennas, but when the number of antennas is less than $N_f$, pilot symbols can be inserted.

Next, a pattern of the pilot symbol will be described in detail referring to FIG. 14.

In the pilot slot 20 according to the third preferred embodiment, the pilot pattern shown in FIG. 10 is used in common for all the antennas, positions of the pilot symbols $AP_0$, $AP_1$, $AP_2$, and $AP_3$ according to the respective antennas are modified for each predetermined period, and the patterns for changing the positions of the pilot symbols $AP_0$, $AP_1$, $AP_2$, and $AP_3$ according to the respective antennas are differently allocated for the respective cells $C_1$ and $C_2$.

In general, when a plurality of transmit antennas are provided, a pilot transmit power for each antenna can be varied. For example, a common channel and a control channel have fixed data rates and use two default antennas, and a data channel has a variable data rate according to channel conditions and uses not more than four antennas. When fast transmission is possible through the MIMO (multi input multi output) method, a user who uses this method may be predicted to be a user who stays near the base station. Therefore, two residual antennas other than the default antenna will transmit signals with much lesser power compared to the default antenna. In this instance, interference caused by the pilot symbols of adjacent cells can be reduced by differentiating the positions of the pilot symbols of antennas for the respective adjacent cells, and preventing the subcarriers for transmitting the pilot symbols of the default antenna with high power from being superposed.

Table 1 shows a method for minimizing the interference caused by the pilot symbol of the default antenna among six adjacent cells (cell A to cell F) when two default antennas (antenna 0 and antenna 1) are used and two antennas (antenna 2 and antenna 3) for fast transmission are used. In this instance, subcarrier group numbers (group 0 to group 3) represent positions of the subcarriers for transmitting predefined pilot symbols so as to transmit pilot symbols of an antenna, and the subcarrier group numbers are commonly used for all the cells. It is assumed that the antennas 2 and 3 transmit signals with lesser powers compared to the antennas 0 and 1, and a terminal which receives the signals through the antennas 2 and 3 is provided near a base station and is rarely influenced by other cells. When groups transmitted through one of the antennas 0 and 1 between the two different cells are superimposed, interference is generated to the pilot symbol, and a design is provided so as to minimize it.

TABLE 1

|        | Antenna 0 | Antenna 1 | Antenna 2 | Antenna 3 |
|--------|-----------|-----------|-----------|-----------|
| Cell A | Group 0   | Group 1   | Group 2   | Group 3   |
| Cell B | Group 0   | Group 2   | Group 3   | Group 1   |
| Cell C | Group 3   | Group 0   | Group 2   | Group 1   |
| Cell D | Group 1   | Group 2   | Group 0   | Group 3   |
| Cell E | Group 3   | Group 1   | Group 0   | Group 2   |
| Cell F | Group 2   | Group 3   | Group 0   | Group 1   |

Table 2 shows the number of superimposed groups transmitted by one of the antennas 0 and 1 between two different cells in the case of Table 1. When a specific position is superimposed or a superimposed number between two different cells having a different superimposed number between two specific cells is different, a plurality of patterns having different superimposed positions and numbers according to the two cells, as shown in Table 1 are generated, and they are alternately transmitted at intervals of a specific period.

TABLE 2

|        | Cell A | Cell B | Cell C | Cell D | Cell E | Cell F |
|--------|--------|--------|--------|--------|--------|--------|
| Cell A | X      | 1      | 1      | 1      | 1      | 0      |
| Cell B | 1      | X      | 1      | 1      | 0      | 1      |
| Cell C | 1      | 1      | X      | 0      | 1      | 1      |
| Cell D | 1      | 1      | 0      | X      | 1      | 1      |
| Cell E | 1      | 0      | 1      | 1      | X      | 1      |
| Cell F | 0      | 1      | 1      | 1      | 1      | X      |

Next, a synchronization and cell search method when using at least one transmit antenna in the downlink of the OFDMA-based mobile communication system according to the third preferred embodiment of the present invention will be described with reference to FIG. 15.

Figure 15:
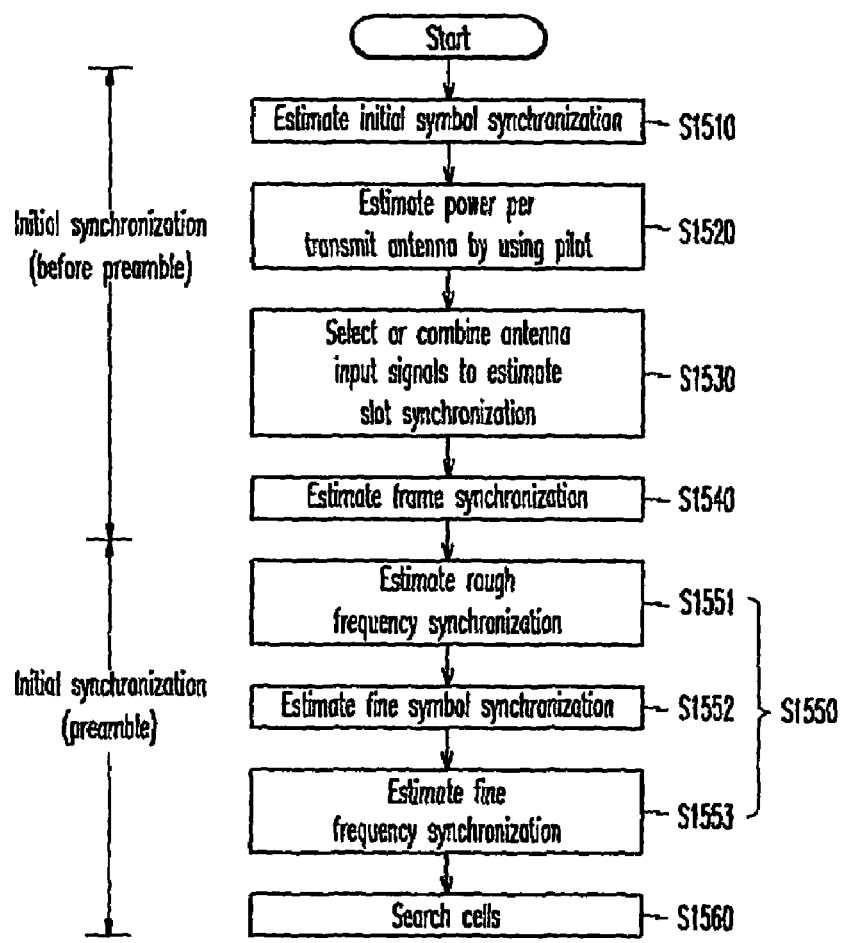
FIG. 15 shows a flowchart for a synchronization and cell search method according to a third preferred embodiment of the present invention.

FIG. 15 shows a flowchart for a synchronization and cell search method according to the third preferred embodiment of the present invention.

For the purpose of initial synchronization, a CP of the OFDM transmit signal is used to estimate initial symbol synchronization in step S1510, and the estimated initial symbol synchronization is used to estimate a signal power for each transmit antenna in step S1520. Next, the signal powers of the respective transmit antennas estimated in the previous step S1520 are used to select or combine a common pilot pattern part of the transmit antennas having the maximum power or a power greater than a predefined reference value, and estimate the slot synchronization in step S1530. The slot synchronization estimated in the previous step S1530 and the synchronization preamble 110 of the preamble are used to estimate frame synchronization in step S1540. Next, the synchronization preamble 110 of the preamble is used to estimate a frequency offset in step S1151, the synchronization preamble 110 of the preamble is used to estimate fine symbol synchronization in step S1552, and the cell search preamble 120 is used to estimate fine frequency synchronization in step S1553. The time and frequency are synchronized in step S1550 through the synchronization process of from S1551 to S1553, and the cell search preamble 120 is used to search the cells in step S1560. In the step of S1560, a specific pattern for each cell of the pilot is used rather than the cell search preamble 120, or the cell search preamble 120 and the specific pattern are used to search the cells.

Next, referring to FIG. 16, a method for searching adjacent cells when the inter-cell synchronization is performed by using a GPS (global positioning system) in the downlink of the OFDMA-based mobile communication system will be described.

Figure 16:
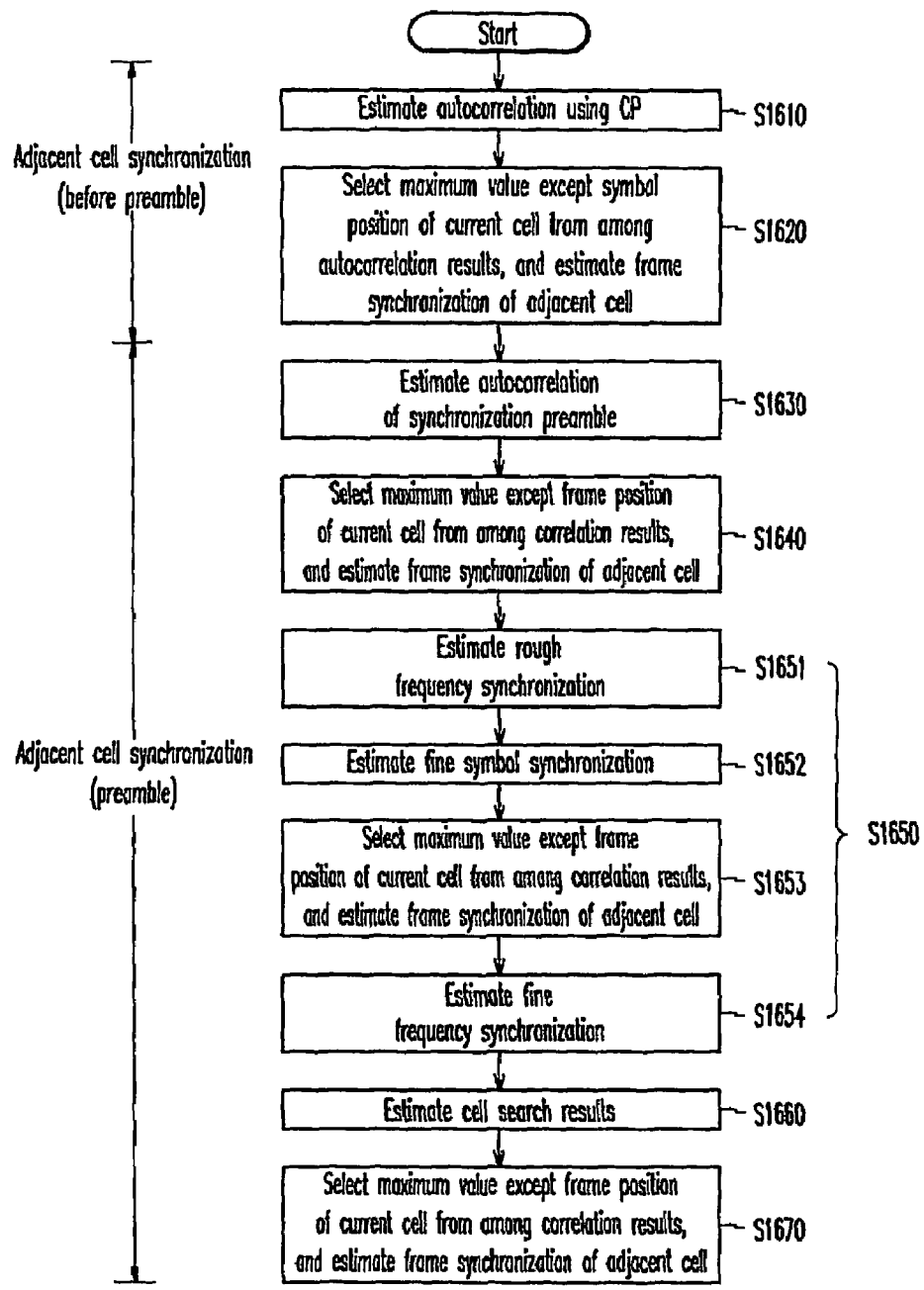
FIGS. 16 and 17 show flowcharts for searching adjacent cells in the downlink of an OFDMA-based mobile communication system according to fourth and fifth preferred embodiments of the present invention.

FIG. 16 shows a flowchart for searching adjacent cells in the downlink of an OFDMA-based mobile communication system according to the fourth preferred embodiment of the present invention.

As shown in FIG. 16, a CP of the OFDM transmit signal is used to find autocorrelation of a symbol in step S1610, and a result which corresponds to a symbol start position of the current cell is excluded from the autocorrelation result and a point which has the maximum value is estimated to estimate the symbol synchronization of the adjacent cells in step S1620. The symbol synchronization of the adjacent cell estimated in the step S1620 and the synchronization preamble of the preamble are used to estimate autocorrelation in step S1630, and a result which corresponds to the frame start position of the current cell is excluded from the autocorrelation result and a point having the maximum value is estimated to estimate the frame synchronization of the adjacent cell in step S1640.

Next, the synchronization preamble of the preamble is used to estimate a frequency offset in step S1651, and the synchronization preamble of the preamble is used to estimate symbol synchronization correlation in step S1652. A result which corresponds to the symbol start position of the current cell is excluded from the symbol synchronization correlation of the step S1652 and a point having the maximum value is estimated to estimate fine symbol synchronization of the adjacent cell in step S1653, and the cell search preamble is used to estimate fine frequency synchronization in step S1654.

The time and frequency are synchronized in step S1650 through the synchronization process of from S1651 to S1654, the cell search preamble is used to obtain a cell search result in step S1660, and a result which corresponds to the current cell is excluded from the result obtained in the step S1660 and the adjacent cells are searched in step S1670. In the step of S1660, a specific pattern for each cell of the pilot is used rather than the cell search preamble, or the cell search preamble and the specific pattern are used to search the cells.

Figure 17:
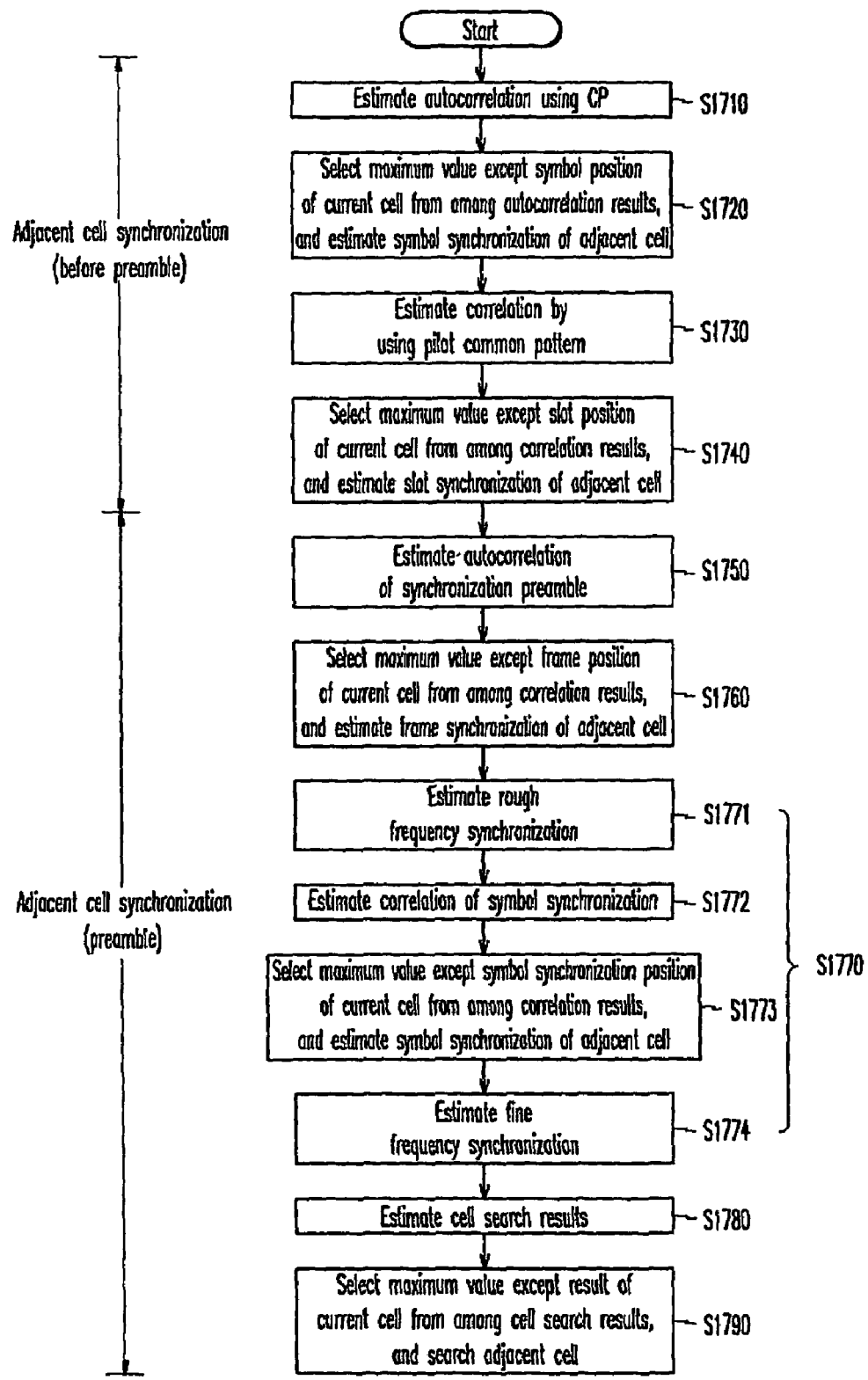

Next, referring to FIG. 17, a method for searching adjacent cells when the cells are not synchronized in the downlink of the OFDMA-based mobile communication system will be described. FIG. 17 shows a flowchart for searching adjacent cells in the downlink of an OFDMA-based mobile communication system according to the fifth preferred embodiment of the present invention.

As shown in FIG. 17, a CP of the OFDM transmit signal is used to find autocorrelation of a symbol in step S1710, and a result which corresponds to a symbol start position of the current cell is excluded from the autocorrelation result and a point which has the maximum value is estimated to estimate the initial symbol synchronization of the adjacent cells in step S1720. The symbol synchronization of the adjacent cell estimated in the step S1720 and a pattern of the pilot in common for each cell are used to estimate correlation in step S1730, and a point which corresponds to the current cell is excluded from the correlation result, and slot synchronization is estimated in step S1740. The slot synchronization obtained in the step S1740 and the synchronization preamble of the preamble are used to estimate autocorrelation in step S1750, and a result which corresponds to the frame start position of the current cell is excluded from the autocorrelation result and a point having the maximum value is estimated to estimate the frame synchronization of the adjacent cell in step S1760.

Next, the synchronization preamble of the preamble is used to estimate a frequency offset in step S1771, and the synchronization preamble of the preamble is used to estimate symbol synchronization correlation in step S1772. A result which corresponds to the symbol position of the current cell is excluded from the correlation result of the step S1772 and a point having the maximum value is estimated to estimate fine symbol synchronization of the adjacent cell in step S1773, and the cell search preamble is used to estimate fine frequency synchronization in step S1774.

The time and frequency are synchronized in step S1770 through the synchronization process of from S1771 to S1774, the cell search preamble is used to obtain a cell search result in step S1780, and a result which corresponds to the current cell is excluded from the cell search result. The adjacent cells are searched in step S1790. In the step of S1780, a specific pattern for each cell of the pilot is used rather than the cell search preamble, or the cell search preamble and the specific pattern are used to search the cells.

When at least one transmit antenna is provided in the downlink of preferred embodiments of FIGS. 16 and 17, the method described in FIG. 15 can be applied. That is, in the like manner of the preferred embodiment of FIG. 15, when the slot synchronization is estimated, the power is estimated per antenna, a common pilot pattern part of the transmit antennas having the maximum power or a power greater than a predefined reference value is selected or combined, and the slot synchronization is estimated.

Also, when the terminal has at least one receive antenna in the preferred embodiments of FIGS. 2B, 11B, 15, 16, and 17, the received signals are respectively processed for the respective receive antennas for the respective stages, and the results are appropriately selected or combined, and then used.

Next, referring to FIGS. 6 and 7, a method for tracking frequencies and tracking symbol synchronization according to the preferred embodiment will be described in detail. A frequency tracker and symbol synchronization tracker has the same configuration as those of the frequency synchronization estimator 600 and the fine symbol synchronization estimator 700 shown in FIGS. 6 and 7. Since the frequency tracker and symbol synchronization tracker have the same configuration as the frequency synchronization estimator 600 and the fine symbol synchronization estimator 700 respectively, they can be shared as a single device or can be formed as individual devices.

As shown in FIG. 6, an OFDM receive signal y(n+l+N) is delayed by the delay unit 610 by a length N of a valid OFDM symbol, and correlated by the correlator 620. The moving average unit 630 calculates a moving average of the OFDM receive signal y(n+l+N) and the correlation value y*(n+l) of the delayed signal, and the frequency offset detector 640 detects a phase of the moving average and finds a frequency offset $\hat{\epsilon}$. The frequency offset $\hat{\epsilon}$ is given in Equation 8. The frequency tracking is performed for each OFDM symbol, and performed by the phase difference between a CP of the OFDM transmit signal and a valid OFDM symbol including the CP.

$$\hat{\epsilon} = \frac{1}{2\pi} \arg \left\{ \sum_{l=0}^{L-1} y^*(n+l) y(n+l+N) \right\}$$

Equation 8 where $\hat{\epsilon}$ is a frequency offset, L is an averaged number of times, and N is a length $N_{sym} - N_{CP}$ of the valid OFDM symbol from the OFDM symbol.

When a new frame is received while tracking the frequency, the synchronization preamble and cell search preamble are used to track symbol synchronization according to the device of FIG. 7 and Equation 4, and track fine frequency synchronization according to Equation 8.

Figure 18:
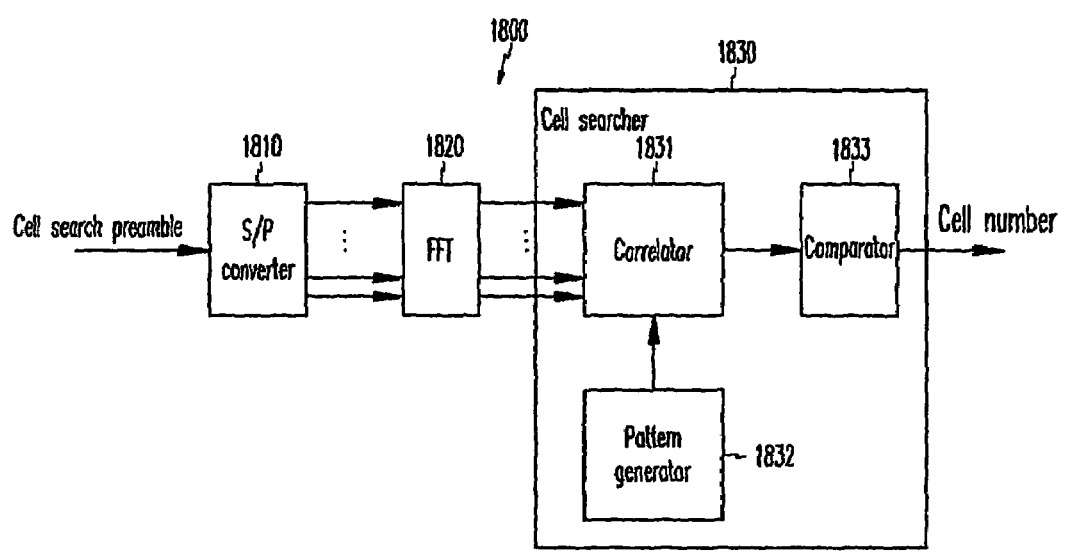
FIG. 18 shows a brief block diagram for a cell search device.

Next, referring to FIG. 18, a cell search method according to the preferred embodiment will be described. FIG. 18 shows a brief block diagram for a cell search device.

As shown in FIG. 18, the cell search device comprises a serial/parallel converter 1810, an FFT unit 1820, and a cell searcher 1830. The cell searcher 1830 comprises a correlator 1831, a pattern generator 1832, and a comparator 1833. A received cell search preamble is converted into a parallel cell search preamble by the serial/parallel converter 1810, and Fourier transform is performed on the parallel cell search preamble by the FFT unit 1820, and the Fourier-transformed preamble is input to the cell searcher 1830. The pattern generator 1832 generates cell search preamble patterns corresponding to the respective cells from frequency domain signals of the cell search preamble input by the FFT unit 1820. The correlator 1831 finds cross correlation of the cell search preamble patterns and the input signals, and the comparator 1833 compares cross correlation values and selects the cell number which has the largest value, thereby searching the cells.

Next, referring to FIGS. 19 and 20, a terminal synchronizer for performing the synchronization and cell search method described through FIGS. 1 to 18 will be described.

Figure 19:
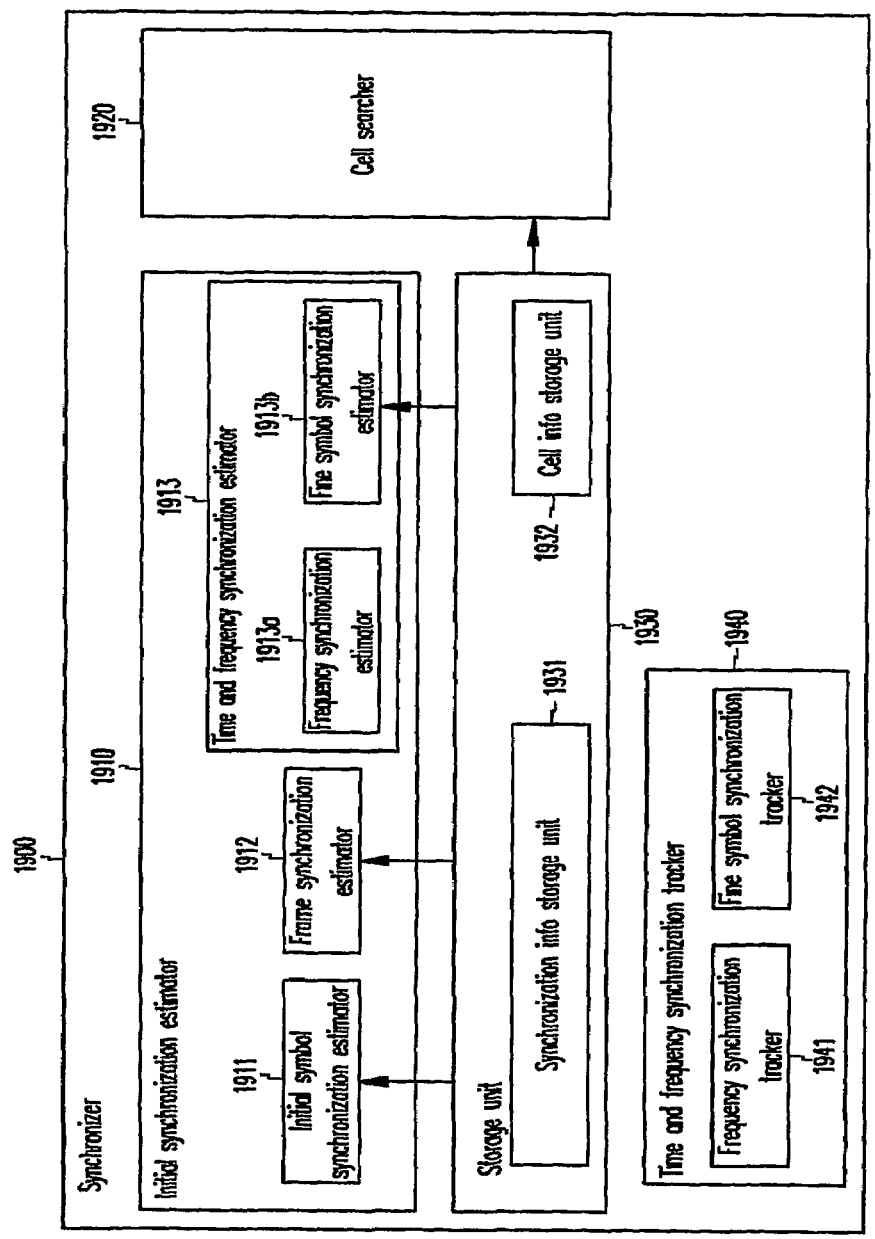
FIGS. 19 and 20 show brief block diagrams for a synchronizer of a terminal according to preferred embodiments of the present invention.
Figure 20:
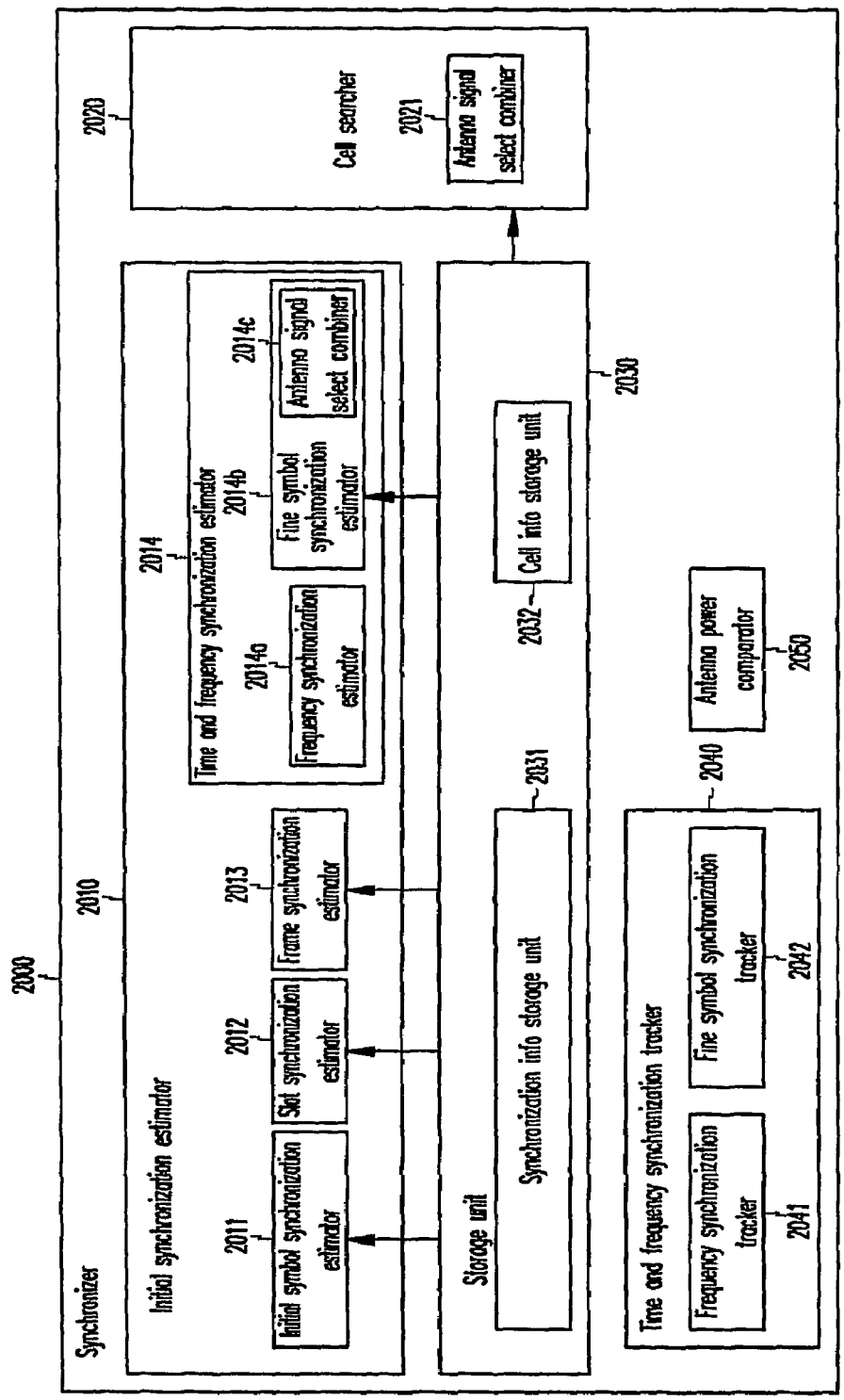

FIGS. 19 and 20 show brief block diagrams for a synchronizer of a terminal according to preferred embodiments of the present invention.

As shown in FIG. 19, the terminal synchronizer 1900 comprises an initial synchronization estimator 1910, a cell searcher 1920, a storage unit 1930, and a time and frequency synchronization tracker 1940, applied to the first preferred embodiment shown in FIGS. 1 to 10.

The initial synchronization estimator 1910 comprises an initial symbol synchronization estimator 1911, a frame synchronization estimator 1912, and a time and frequency synchronization estimator 1913. The initial symbol synchronization estimator 1911 uses a CP of the OFDM transmit signal to estimate initial symbol synchronization, the frame synchronization estimator 1912 uses the symbol synchronization estimated by the initial symbol synchronization estimator 1911 and the synchronization preamble to estimate the frame synchronization. The time and frequency synchronization estimator 1913 uses the synchronization preamble of the preamble and the cell search preamble to estimate the time and frequency synchronization. When the symbol and the frequency are synchronized by the time and frequency synchronization estimator 1913, the cell searcher 1920 uses one/both of the cell search preamble and the pattern specific to the cell of the pilot, and searches the cells.

The time and frequency synchronization tracker 1940 comprises a frequency synchronization tracker 1941 and a fine symbol synchronization tracker 1942. The frequency synchronization tracker 1941 uses a phase difference between a CP of the OFDM transmit signal and a valid OFDM symbol including the CP to track the frequency, and uses a synchronization preamble to track the symbol synchronization. The storage unit 1930 comprises a synchronization information storage unit 1931 and a cell information storage unit 1932 for respectively storing synchronization information and cell information of the current cell.

In the case of searching the adjacent cells, the initial synchronization estimator 1910 and the cell searcher 1920 exclude the point which corresponds to the current cell information stored in the synchronization information storage unit 1931 and the cell information storage unit 1932, and search the cells.

The time and frequency synchronization estimator 1913 comprises a frequency synchronization estimator 1913a and a fine symbol synchronization estimator 1913b. The frequency synchronization estimator 1913a uses a synchronization preamble of a preamble to estimate a frequency offset, and uses a cell search preamble to estimate fine frequency synchronization. The fine symbol synchronization estimator 1913b uses a synchronization preamble of a preamble to estimate symbol synchronization. As described above, the fine symbol synchronization estimator 1913b and the fine symbol synchronization tracker 1942 can be shared as a single device, and the frequency synchronization estimator 1913a and the frequency synchronization tracker 1941 can also be shared as a single device.

As shown in FIG. 20, a synchronizer 2000 according to another preferred embodiment of the present invention comprises an initial synchronization estimator 2010, a cell searcher 2020, a storage unit 2030, and a time and frequency synchronization tracker 2040 in the like manner of FIG. 19. The synchronizer 2000 shown in FIG. 20 has the same structure as that of the synchronizer 1900 shown in FIG. 19 except for the initial synchronization estimator 2010.

In detail, the initial synchronization estimator 2010 comprises an initial symbol synchronization estimator 2011, a slot synchronization estimator 2012, a frame synchronization estimator 2013, and a time and frequency synchronization estimator 2014. The initial symbol synchronization estimator 2011 uses a CP of the OFDM transmit signal to estimate initial symbol synchronization, the slot synchronization estimator 2012 uses the symbol synchronization estimated by the initial symbol synchronization estimator 2011 and a pattern of a pilot in common for each cell to estimate slot synchronization. The frame synchronization estimator 2013 uses the slot synchronization estimated by the slot synchronization estimator 2012 and the synchronization preamble to estimate the frame synchronization. The time and frequency synchronization estimator 2014 uses the synchronization preamble of the preamble and the cell search preamble to estimate the time and frequency synchronization. When the symbol and the frequency are synchronized by the time and frequency synchronization estimator 2014, the cell searcher 2020 uses one/both of the cell search preamble and the pattern specific to the cell of the pilot, and searches the cells.

The time and frequency synchronization estimator 2014 comprises a frequency synchronization estimator 2014a and a fine symbol synchronization estimator 2014b which includes an antenna signal select combiner 2014c. The frequency synchronization estimator 2014a uses a synchronization preamble of the preamble to estimate a frequency offset, and uses a cell search preamble part to estimate fine frequency synchronization. The fine symbol synchronization estimator 2014b uses a synchronization preamble of the preamble to estimate symbol synchronization.

The time and frequency synchronization tracker 2040 includes a frequency synchronization tracker 2041 and a fine symbol synchronization tracker 2042, and performs the same function as that of the time and frequency synchronization tracker 1940 of FIG. 19. The storage unit 2030 comprises a synchronization information storage unit 2031 and a cell information storage unit 2032 and performs the same function as that of the storage unit of FIG. 19.

In the case of searching the adjacent cells, the initial synchronization estimator 2010 and the cell searcher 2020 exclude the point which corresponds to the current cell information stored in the synchronization information storage unit 2031 and the cell information storage unit 2032, and search the cells.

When at least one downlink transmit antenna is provided in FIG. 20, the synchronizer 2000 of FIG. 10 can further comprise an antenna power comparator 2050, and the fine symbol synchronization estimator 2014b and the cell searcher 2020 can further comprise antenna signal select combiners 2014c and 2021, respectively. The antenna power comparator 2050 estimates and compares pilot powers of the transmit antennas, and the antenna signal select combiners 2014c and 2021 select, combine, and use the results processed per antenna.

Next, referring to FIG. 21, a downlink signal configuring device of a base station of the OFDMA-based mobile communication system according to a preferred embodiment of the present invention will be described in detail.

Figure 21:
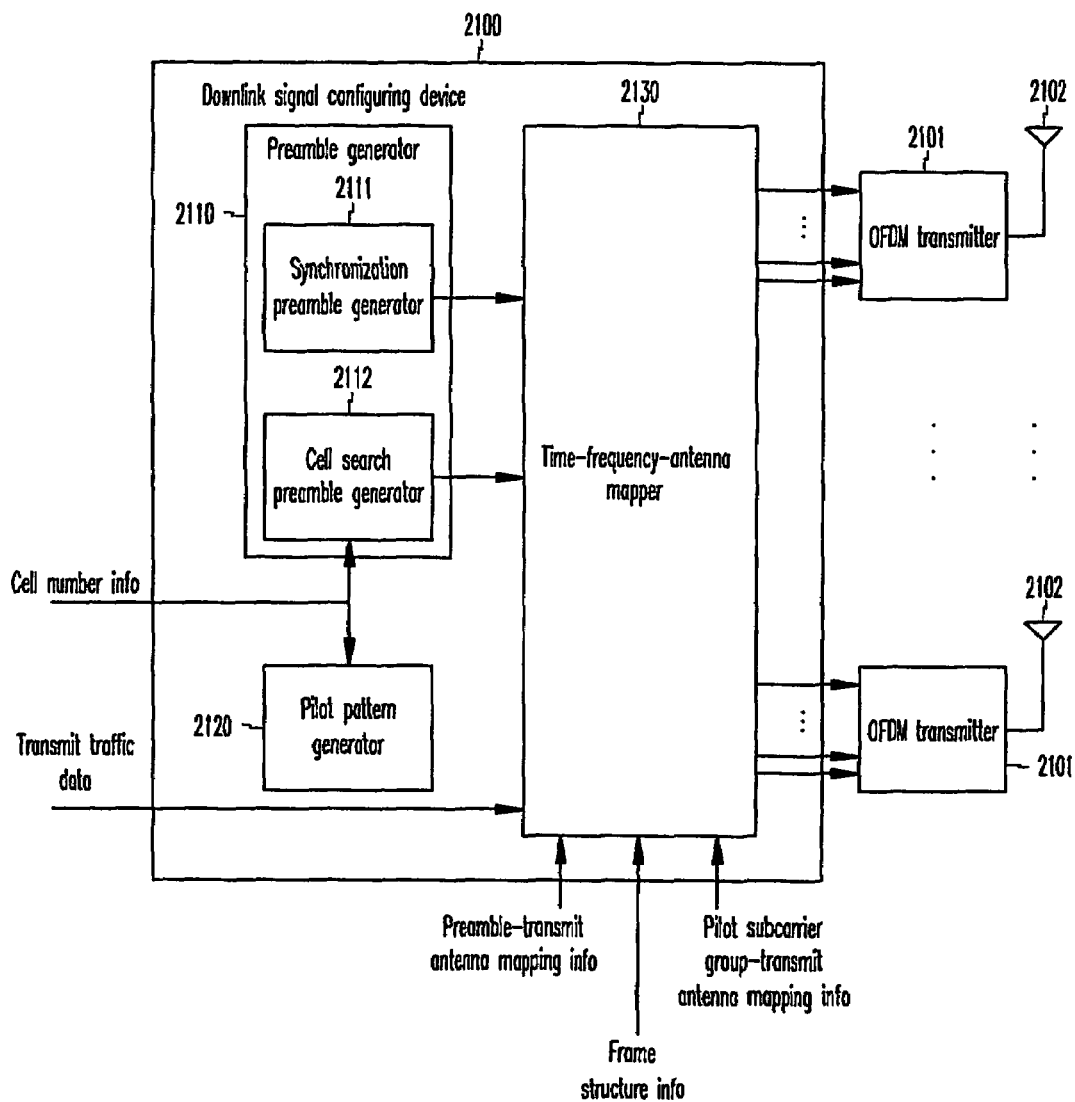
FIG. 21 shows a brief block diagram for a downlink signal configuring device of a base station of an OFDMA-based mobile communication system according to preferred embodiments of the present invention.

FIG. 21 shows a brief block diagram for a downlink signal configuring device of a base station of an OFDMA-based mobile communication system according to preferred embodiments of the present invention.

As shown in FIG. 21, the downlink signal configuring device 2100 comprises a preamble generator 2110, a pilot pattern generator 2120, and a time-frequency-antenna mapper 2130. The preamble generator 2110 receives external cell number information to generate a preamble, and includes a synchronization preamble generator 2111 and a cell search preamble generator 2112. The synchronization preamble generator 2111 receives cell number information and generates a synchronization preamble pattern, and the cell search preamble generator 2112 receives cell number information and generates a pilot pattern per transmit antenna. The time-frequency-antenna mapper 2130 receives external preamble-transmit antenna mapping information, pilot subcarrier group-transmit antenna mapping information, frame structure information, and transmit traffic data, maps the data according to the time, frequency, and antenna, and outputs mapped results to the OFDM transmitter 2101 per transmit antenna 2102.

According to the present invention, the preamble and the pilot structure appropriate for initial synchronization, cell search, and adjacent cell search in the downlink of the OFDMA-based mobile communication system is provided. By using this, the initial symbol synchronization, slot synchronization, frame synchronization, symbol synchronization, and cell search are sequentially performed, and the downlink synchronization and the cell search are performed with a lesser amount of calculation in the OFDMA-based mobile communication system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a method for synchronizing downlink signals of a mobile communication system, and searching cells wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, a method for synchronizing downlink signals and searching cells, comprising:

(a) estimating a point at which correlation of a cyclic prefix of the downlink signal and a valid symbol becomes the maximum as a symbol timing, and estimating initial symbol synchronization;

(b) using a characteristic that the real number part of the autocorrelation of the estimated initial symbol synchronization and the first and second symbols has a negative sign, and estimating frame synchronization;

(c) using the estimated frame synchronization and the first and second preambles, and estimating time and frequency synchronization; and (d) using the second preamble and searching the cells when the time and frequency are synchronized through the synchronization step of (c).

2. The method of claim 1, wherein the step of (c) comprises:

detecting a phase of a moving average of a signal obtained by delaying the downlink signal by a repeated time difference and the downlink signal, and estimating a frequency offset;

estimating a point for maximizing the correlation result of the pattern of the first preamble and the downlink signal, and estimating fine symbol synchronization; and using the second preamble, and estimating fine frequency synchronization.

3. The method of claim 1, wherein a pilot pattern of the pilot symbol in the second slot includes a first pattern in common for each cell, and a second pattern different for each cell, and the step of (b) comprises:

using the estimated symbol synchronization and the first pattern, and estimating slot synchronization; and using a characteristic that the real number part of the autocorrelation of the estimated slot synchronization and the first and second symbols has a negative sign, and estimating frame synchronization.

4. The method of claim 3, wherein the pilot symbols in the second slot are provided on the time axis and the frequency axis for each of a plurality of transmit antennas, and the step of estimating the slot synchronization comprises:

using the estimated initial symbol synchronization, and estimating a signal power for each transmit antenna;

comparing the estimated signal powers of the respective antennas with a predefined reference value; and selecting or combining the first pattern of the transmit antenna having a power greater than the reference value, and estimating slot synchronization.

5. In a method for synchronizing and searching adjacent cells from downlink signals of a mobile communication system wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, a method for synchronizing adjacent cells and searching cells, comprising:

(a) calculating autocorrelation of a cyclic prefix of the downlink signal and a valid symbol:

(b) excluding a result which corresponds to a symbol start position of the current cell from a result of the autocorrelation, estimating a point for maximizing the autocorrelation, and estimating initial symbol synchronization of adjacent cells;

(c) using the estimated initial symbol synchronization of the adjacent cell, and estimating autocorrelation of the first preamble;

(d) excluding a result which corresponds to a frame start position of the current cell from a result of the autocorrelation estimated in (c), estimating a point for maximizing the result of the autocorrelation, and estimating frame synchronization of adjacent cells;

(e) using the estimated frame synchronization of the adjacent cells and the first and second preambles, and estimating time and frequency synchronization of the adjacent cells; and (f) using the second preamble to search the cells, and excluding a result which corresponds to the current cell from the cell search result to search the cells.

6. The method of claim 5, wherein the step of (e) comprises:

using the first preamble, and estimating a frequency offset;

using the first preamble, and estimating symbol synchronization correlation;

excluding a result which corresponds to a symbol start position of the current cell from the symbol synchronization correlation result, estimating a point for maximizing the correlation result, and estimating fine symbol synchronization of the adjacent cell; and using the second preamble, and estimating fine frequency synchronization.

7. The method of claim 5, wherein the step of (f) comprises: further using a specific pattern for each cell of the pilot symbol, and searching the cells.

8. In a method for synchronizing and searching adjacent cells from downlink signals of a mobile communication system wherein a frame of the downlink signal comprises: a first slot which includes a first preamble having a first symbol with a valid symbol length and a second symbol corresponding to part of the first symbol with a phase rotated by 180°, and a second preamble which has a pattern specific to each cell for cell search; and a plurality of second slots which have a plurality of pilot symbols provided on the time axis and the frequency axis, and a pilot pattern of the pilot symbol in the second slot includes a first pattern in common for each cell and a second pattern different for each cell, a method for synchronizing adjacent cells and searching cells, comprising:

(a) calculating autocorrelation of a cyclic prefix of the downlink signal and a valid symbol;

(b) excluding a result which corresponds to a symbol start position of the current cell from a result of the autocorrelation, estimating a point for maximizing the autocorrelation, and estimating initial symbol synchronization of adjacent cells;

(c) using the estimated symbol synchronization of the adjacent cell, and signal-processing the first pattern;

(d) excluding a slot position of the current cell from the signal processed result in (c), selecting a point for maximizing the signal processed result, and estimating slot synchronization of adjacent cells;

(e) using the estimated slot synchronization of the adjacent cells, and estimating autocorrelation of the first preamble;

(f) excluding a result which corresponds to a frame start position of the current cell from a result of the autocorrelation estimated in (e), estimating a point for maximizing the result of the autocorrelation, and estimating frame synchronization of the adjacent cell;

(g) using the estimated frame synchronization of the adjacent cell: and the first and second preambles, and estimating time and frequency synchronization of the adjacent cell; and (h) using the second preamble to search the cells, excluding a result which corresponds to the current cell from the cell search result, and searching the cells.

9. The method of claim 8, wherein the step of (g) comprises:

using the first preamble, and estimating a frequency offset;

using the first preamble, and estimating symbol synchronization correlation;

excluding a result which corresponds to a symbol start position of the current cell from the symbol synchronization correlation result, estimating a point for maximizing the correlation result, and estimating fine symbol synchronization of the adjacent cell; and using the second preamble, and estimating fine frequency synchronization.

10. The method of claim 8, wherein the step of (h) comprises: further using a specific pattern for each cell of the pilot symbol, and searching the cells.

11. In a method for configuring downlink signals in a mobile communication system, a method for configuring downlink signals, comprising:

(a) generating a first preamble which includes a first symbol and a second symbol with the phase difference of 180° with respect to the first symbol;

(b) generating a second preamble having a specific pattern for each cell of a plurality of cells;

(c) generating the first and second preambles as a first slot; and (d) arranging a plurality of pilot symbols an the time axis and the frequency axis, and generating a second slot having the pilot symbols, wherein the first symbol is a symbol which is repeated at intervals of a predetermined time period, and the second symbol is part of the first symbol with the phase rotated by 180°, and wherein the first symbol has a valid symbol length which corresponds to a difference between a length of the transmit symbol and a length of a cyclic prefix, and the second symbol corresponds to the length of the cyclic prefix starting from the beginning part of the first symbol with the phase rotated by 180°.

12. The method of claim 11, wherein the step of (b) comprises generating the second preamble so that another second preamble transmits no signals on a subcarrier on which one second preamble transmits signals, in at least one of symbols by which the second preamble transmits signals in the two different preambles.

13. The method of claim 11, wherein the step of (b) comprises: preventing the another second preamble from transmitting signals on the subcarrier on which a second preamble transmits signals in at least symbol from among the symbols by which the second preamble transmits signals, in the two preambles belonging to different groups in a grouped cell search preamble set, and using the same subcarrier in the same transmit symbol in the two second preambles belonging to the same group, using a predefined receive signal processing method, and allocating a distinguishable signal pattern.

14. The method of claim 11, wherein the step of (d) comprises: forming a set of pilot patterns distinguishable according to signal patterns transmitted to the subcarrier of the transmit symbol for transmitting the pilot symbol, and allocating a pilot pattern specific to each cell.

* * * * *